United States Patent
Arribio et al.

(10) Patent No.: US 12,085,744 B1
(45) Date of Patent: Sep. 10, 2024

(54) SUPERCONFORMAL RECESSED FEATURE FILL SOL-GELS

(71) Applicant: META PLATFORMS TECHNOLOGIES, LLC

(72) Inventors: Alejo Lifschitz Arribio, Redmond, WA (US); Keren Zhang, Woodinville, WA (US); Jonathan Onorato, Seattle, WA (US); Anthony Phan, Redmond, WA (US); Vincent Overney, Bellevue, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 293 days.

(21) Appl. No.: 17/582,614

(22) Filed: Jan. 24, 2022

Related U.S. Application Data

(60) Provisional application No. 63/277,787, filed on Nov. 10, 2021.

(51) Int. Cl.
| | | |
|---|---|---|
| *G02B 27/01* | (2006.01) | |
| *C23C 18/12* | (2006.01) | |
| *F21V 8/00* | (2006.01) | |

(52) U.S. Cl.
CPC ........ *G02B 6/0036* (2013.01); *C23C 18/1204* (2013.01); *C23C 18/1245* (2013.01); *C23C 18/1254* (2013.01); *G02B 27/0172* (2013.01)

(58) Field of Classification Search
CPC .................. C23C 18/1254; C23C 18/1245
See application file for complete search history.

(56) References Cited

U.S. PATENT DOCUMENTS

| | | | |
|---|---|---|---|
| 11,391,950 B2* | 7/2022 | Calafiore | G02B 5/1866 |
| 2006/0131238 A1* | 6/2006 | Xu | B01J 20/282 |
| | | | 521/154 |
| 2008/0022896 A1 | 1/2008 | Karkkainen | |
| 2018/0105719 A1* | 4/2018 | Hintermann | C08G 18/6229 |

OTHER PUBLICATIONS

Barhoum M., et al., "Rapid Sol-Gel Fabrication of High-Quality Thin-Film Stacks on Planar and Curved Substrates," Chemistry of Materials, 2011, 23(23), pp. 5177-5184.

Blanco E., et al., "Insights into the Annealing Process of Sol-Gel TiO2 Films Leading to Anatase Development: The Interrelationship between Microstructure and Optical Properties," Applied Surface Science, 2018, vol. 439, 32 pages.

(Continued)

*Primary Examiner* — Sung H Pak
(74) *Attorney, Agent, or Firm* — Kilpatrick Townsend & Stockton LLP

(57) ABSTRACT

Various systems and methods relating to a feature fill sol-gel material are provided herein. The feature fill sol-gel material may form a superconformal sol-gel coating. The feature fill sol-gel material may include a first titanium precursor composed of Titanium(IV) and an inorganic ligand. The feature fill sol-gel material may be formed by dissolving or suspending the first titanium precursor in a solvent. The feature fill sol-gel material may be annealed to form the superconformal sol-gel coating. The superconformal sol-gel coating may be an optically transparent coating having an absorbance at a wavelength of 450 nm of less than 0.2% per 150 nm and a refractive index ranging from 1.65 to 2.20.

20 Claims, 15 Drawing Sheets

(56) References Cited

OTHER PUBLICATIONS

Coppens P., et al., "Crystallography and Properties of Polyoxotitanate Nanoclusters," Chemical Reviews, 2014, 114, pp. 9645-9661.
Gareso P.L., et al., "Influence of Annealing on Structural and Optical Properties of n-TiO2 Thin Films Grown by Sol-Gel Spin Coating," Journal of Physics: Conference Series, 2019, vol. 1242, 012037, 8 pages.
Lodh S., et al., "Bandgap Engineering of Sol-Gel Spin-Coated TiO2 Thin Film on Glass Substrate," Photonics, Plasmonics and Information Optics, 2021, 18 pages, DOI: 10.1201/9781003047193-2.
Lu Y., et al., "Modifying the Surface Properties of Superparamagnetic Iron Oxide Nanoparticles through A Sol-Gel Approach," Nano Letters, 2002, vol. 2, No. 3, pp. 183-186.
Matthews P.D., et al., "Structure, Photochemistry and Applications of Metal-Doped Polyoxotitanium Alkoxide Cages," Chemical Communications, 2014, 50, pp. 12815-12823.
Rozes L., et al., "Titanium Oxo-Clusters: Precursors for a Lego-Like Construction of Nanostructured Hybrid Materials," Chemical Society Reviews, 2011, 40, pp. 1006-1030.
Sano K., et al., "Optically Transparent Colloidal Dispersion of TiO2 Nanoparticles Storable for longer than One year Prepared by Sol/Gel Progressive Hydrolysis/Condensation," ACS Applied Materials & Interfaces, 2020, 12(40), 13 pages.
Taherniya A., et al., "Thickness Dependence of Structural, Optical and Morphological Properties of Sol-Gel Derived TiO2 Thin Film," Materials Research Express, 2019, vol. 6, 016417, 20 pages.
Tanski T., et al., "Influence of Calcination Temperature on Optical and Structural Properties of TiO2 Thin Films Prepared by Means of Sol-Gel and Spin Coating," Bulletin of the Polish Academy of Sciences Technical Sciences, 2018, vol. 66, No. 2, pp. 151-156, DOI: 10.24425/119069.
Wang N., et al., "Laterally-Driven Piezoelectric Bimorph Mems Actuator With Sol-Gel-Based High-Aspect-Ratio PZT Structure," IEEE 26th International Conference on Micro Electro Mechanical Systems (MEMS), 2013, pp. 197-200.
Yan L., et al., "Porous TiO2 Conformal Coating on Carbon Nanotubes as Energy Storage Materials," Electrochimica Acta, 2015, vol. 169, pp. 73-81.
Aswathy B.R., et al., "Deposition of Tin Oxide Thin Film by Sol-Gel Dip Coating Technique and its Characterization," AIP Conference Proceedings, Oct. 29, 2019, vol. 2162, No. 1, 6 pages.
Gul S., et al., "Tin Oxide Thin Films Prepared By Sol-Gel For PV Applications," Materials Today: Proceedings, Dec. 4, 2015, vol. 2, No. 2, pp. 5793-5798.
International Search Report and Written Opinion for International Application No. PCT/US2023/011301, mailed May 4, 2023, 10 pages.
Marikkannan M., et al., "A Novel Synthesis of Tin Oxide Thin Films by the Sol-Gel Process for Optoelectronic Applications," AIP Advances, American Institute of Physics, Feb. 13, 2015, vol. 5, No. 2 , 8 pages.

\* cited by examiner

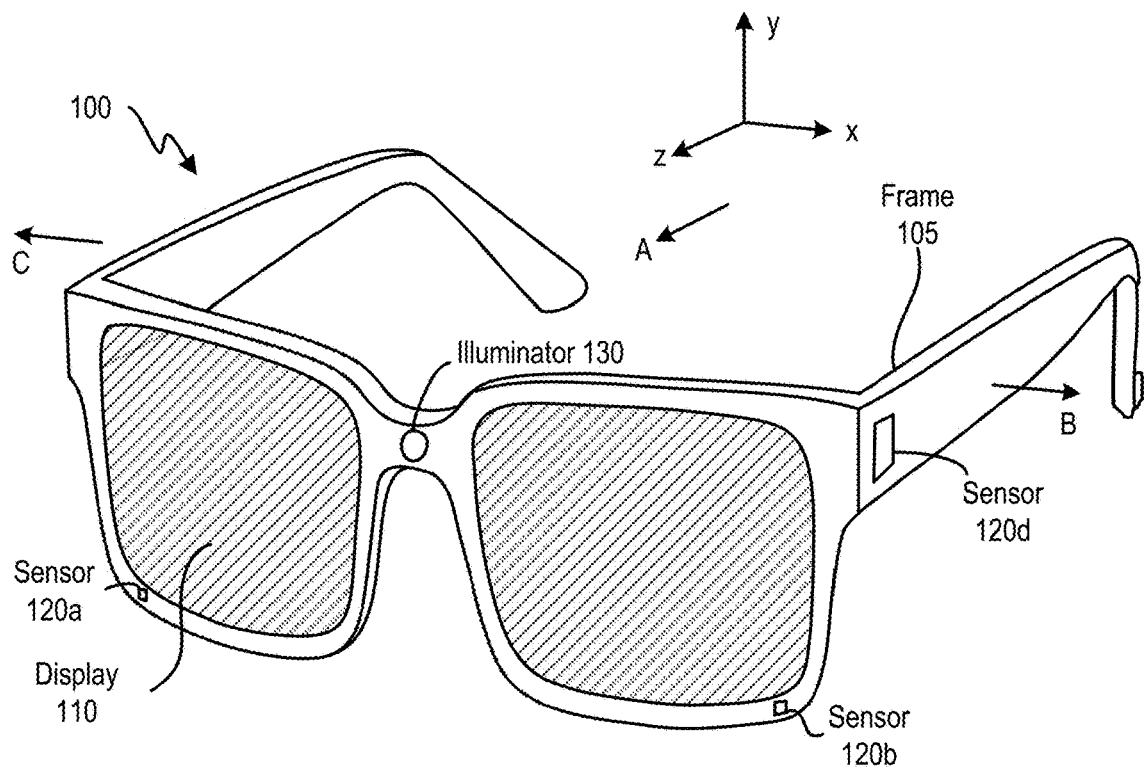
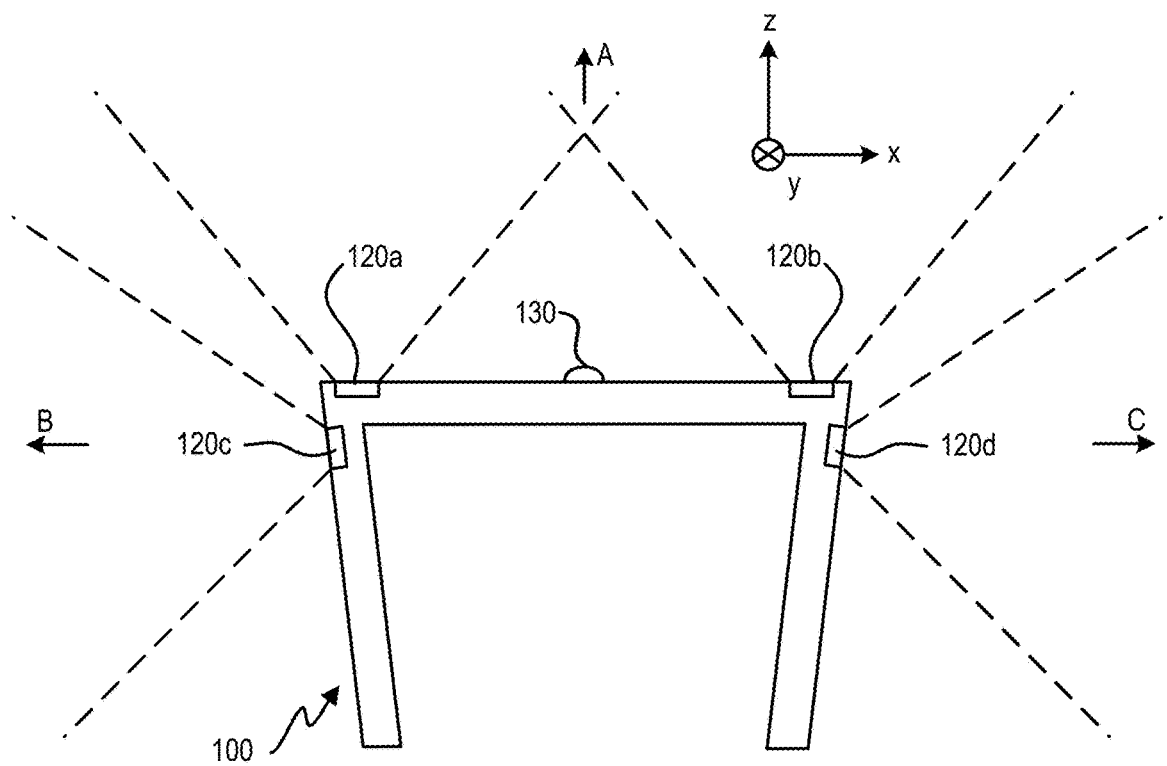
*FIG. 1A*

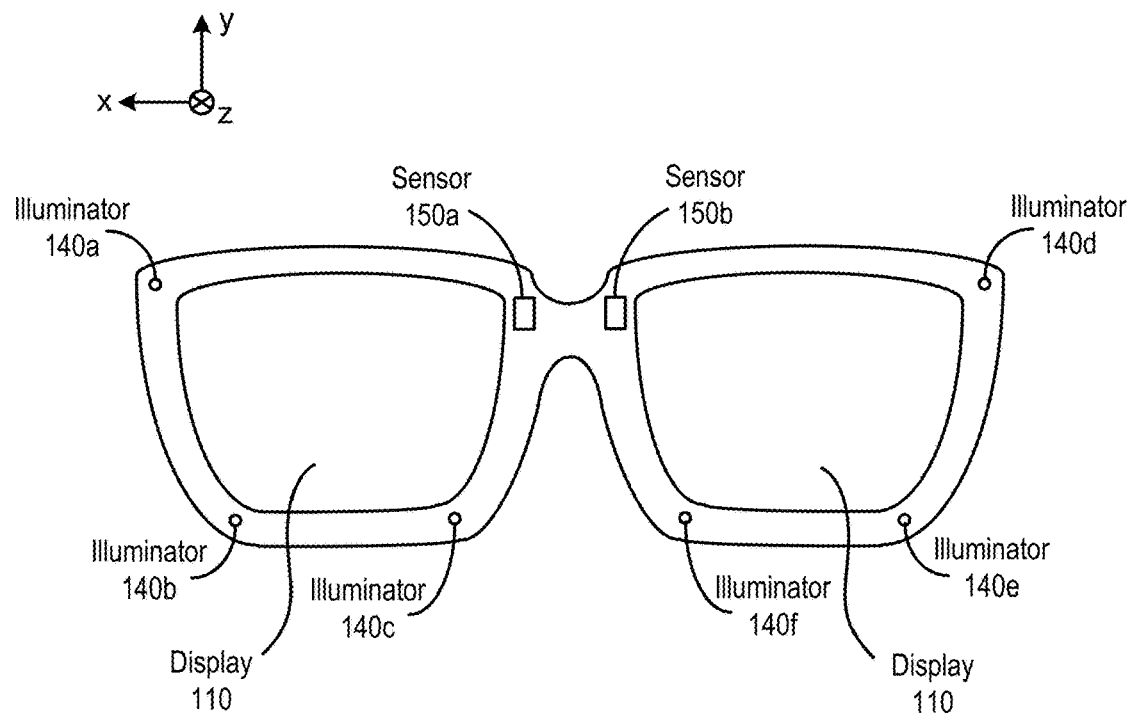
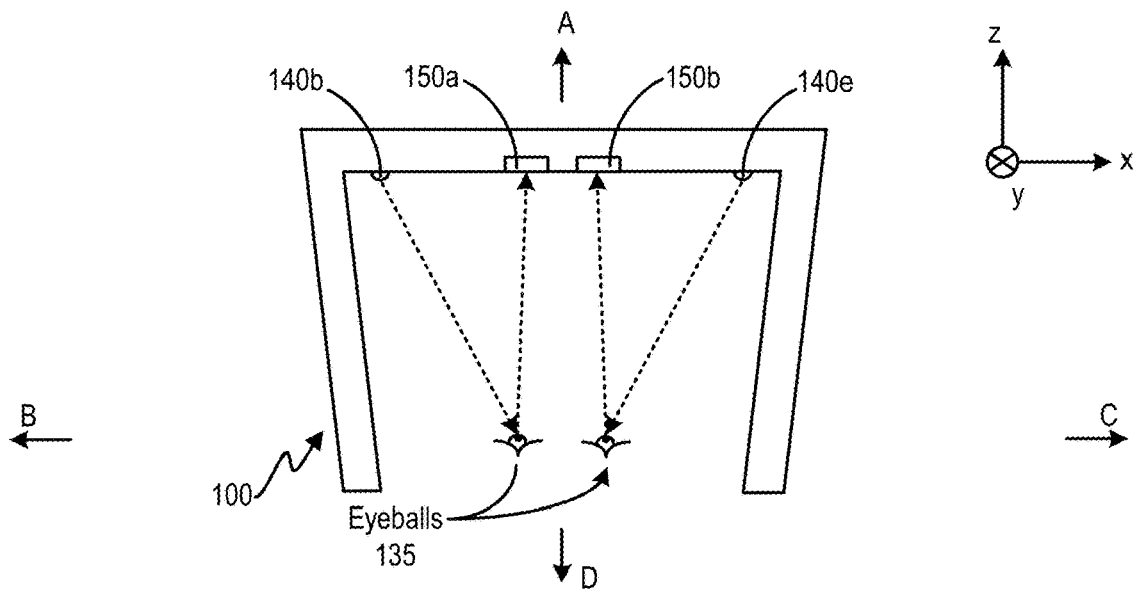
FIG. 1B

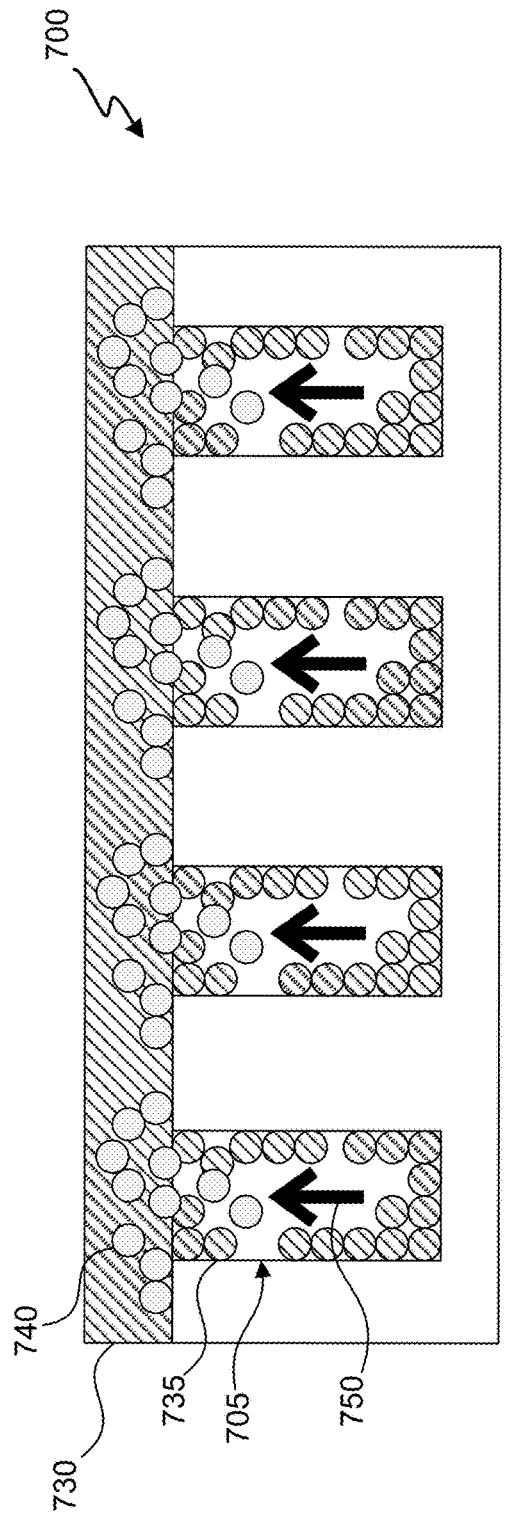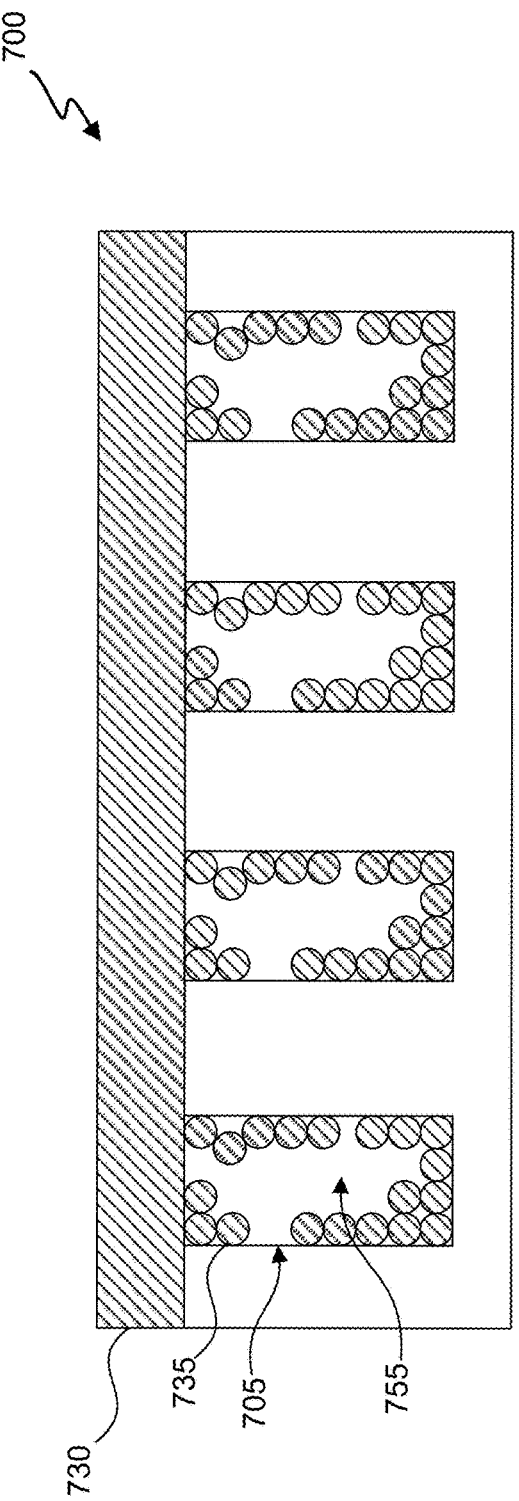

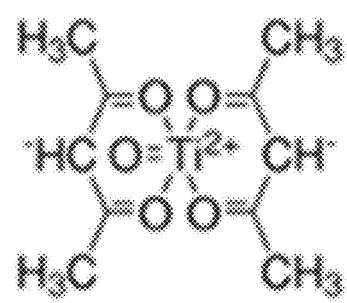 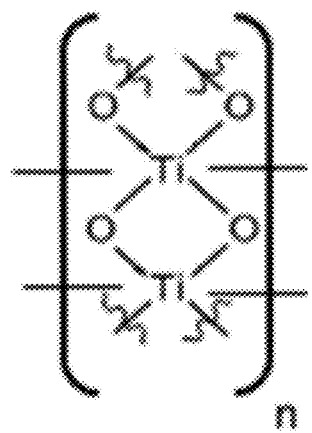
FIG. 9A
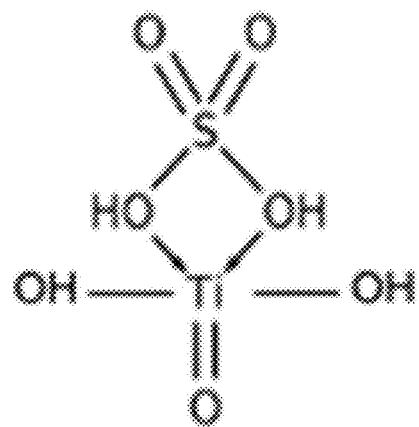
FIG. 9B

SUPERCONFORMAL RECESSED FEATURE FILL SOL-GELS

RELATED APPLICATION

This patent application claims priority to U.S. Provisional Patent Application Ser. No. 63/277,787, filed Nov. 10, 2021, entitled "SUPERCONFORMAL RECESSED FEATURE FILL SOL-GEL," which is assigned to the assignee hereof and is incorporated herein by reference in its entirety for all purposes.

BACKGROUND

Processing of materials to form waveguides generally involves production of recessed features. For example, one or more material layers of a waveguide may be subjected to surface relief grating, such as diffraction grating, to modify the optical properties of the waveguide. During surface relief grating, a plurality of recessed features are formed on the material layer. The recessed features are often nano-sized features having high aspect ratios (e.g., greater than 2). The size and high aspect ratios of these recessed features present challenges for recessed feature fill application. For example, application of conventional sol-gel materials typically results in only a partial fill of the features and void formation within the recessed features. As such, there is a need for a superconformal recessed feature fill material.

SUMMARY

The present disclosure relates to systems and methods for a feature fill sol-gel material for forming a superconformal sol-gel coating. The feature fill sol-gel material may include a first titanium precursor composed of Titanium(IV) and an inorganic ligand. The Titanium(IV) may include a titanium oxo mononuclear species, such as for example, titanium oxy-titanyl. The inorganic ligand may include at least one of a sulfate ligand, a phosphate ligand, a selenium oxide ligand, or a tellurium oxide ligand. In embodiments, the first titanium precursor may include an oxo ligand.

The feature fill sol-gel material may be formed by dissolving or suspending the first titanium precursor in a solvent. For example, the solvent may be or include at least one of water, propylene glycol, ethylene glycol, lactone, ketone, alcohol, diols acetate or ether. In an example embodiment, the feature fill sol-gel material may include a second titanium precursor. In such examples, the first titanium precursor may include at least one of Titanium(IV) oxysulfate or Titanium(IV) oxyphosphate, Titanium(IV) oxyacetylacetonate, Titanium (IV) hydroxide, or a multinuclear network of condensed Titanium(IV) hydroxide, and the second titanium precursor may include at least one of: Titanium(IV) oxysulfate or Titanium(IV) oxyphosphate, Titanium(IV) oxyacetylacetonate, Titanium (IV) hydroxide, or a multinuclear network of condensed Titanium(IV) hydroxide. In some cases, the feature fill sol-gel material may include one or more of an acid, a base, a peroxide, a surfactant, a cross-linker, a flexibilizer additive, a toughener additive, a polymer, or an additional solvent.

The feature fill sol-gel material may be annealed to form the superconformal sol-gel coating. The superconformal sol-gel coating may be an optically transparent coating having an absorbance at a wavelength of 450 nm of less than 0.2% per 150 nm and a refractive index ranging from 1.65 to 2.20.

In an aspect, a method of producing a superconformal optical coating is provided herein. The method may include providing a feature fill sol-gel material. The feature fill sol-gel material may be formed by dissolving or suspending a first titanium precursor composed of Titanium(IV) and an inorganic ligand in a solvent. The method may also include applying the feature fill sol-gel material onto a substrate having a plurality of recessed features. The recessed features may include one or more of gratings, trenches, vias, or through-holes. In some embodiments, the plurality of recessed features may include a feature width ranging from 1 nm to 300 nm and a feature depth ranging from 1 nm to 2000 nm. The recessed features may have a ratio of the feature depth divided by the feature width is equal or greater than 2.

Applying the feature fill sol-gel material onto the substrate may include spin-coating, dip-coating, spray-coating, ink-jet printing, screen-printing, or contact-printing. The feature fill sol-gel material may be applied to form the superconformal optical coating having a final thickness after annealing on a top surface of the substrate of less than 50 nm.

The method may include annealing the feature fill sol-gel material at an annealing temperature less than 500° C. to form the superconformal optical coating. The feature fill sol-gel material may fully densify at the annealing temperature and the superconformal optical coating may fill the plurality of recessed features without forming voids. In an example embodiment, annealing the feature fill sol-gel material may include thermally densifying the feature fill sol-gel material to form the superconformal optical coating for a duration less than 10 minutes. The superconformal optical coating may have a refractive index equal to or greater than 1.65 after annealing.

In another aspect, a waveguide is provided herein. The waveguide may include a substrate having a plurality of recessed features extending from an outer surface of the substrate to a depth into a bulk of the substrate. A superconformal optical coating may be applied to the substrate. The superconformal optical coating may be formed from a feature fill sol-gel material. The feature fill sol-gel material may include a titanium precursor having an oxo-ligand and may fill the plurality of recessed features, after annealing, without forming voids. The superconformal optical coating may include a refractive index ranging from 1.65 to 2.20 and an absorption of less than 0.2% per 150 nm of thickness. In some examples, the superconformal optical coating may include a thickness on the outer surface of the substrate that is equal to or less than 50 nm.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 1A and 1B are diagrams of an embodiment of a near-eye display;

FIGS. 7A and 7B illustrate an example challenge that arises from applying conventional sol-gel materials to recessed features, according to an embodiment herein;

FIG. 9A illustrates an example formulation of a titanium oxo mononuclear species used to form a feature fill sol-gel material, according to an embodiment herein;

FIG. 9B illustrates an example formulation of a titanium precursor used to form a feature fill sol-gel material, according to an embodiment herein;

Figure 2:
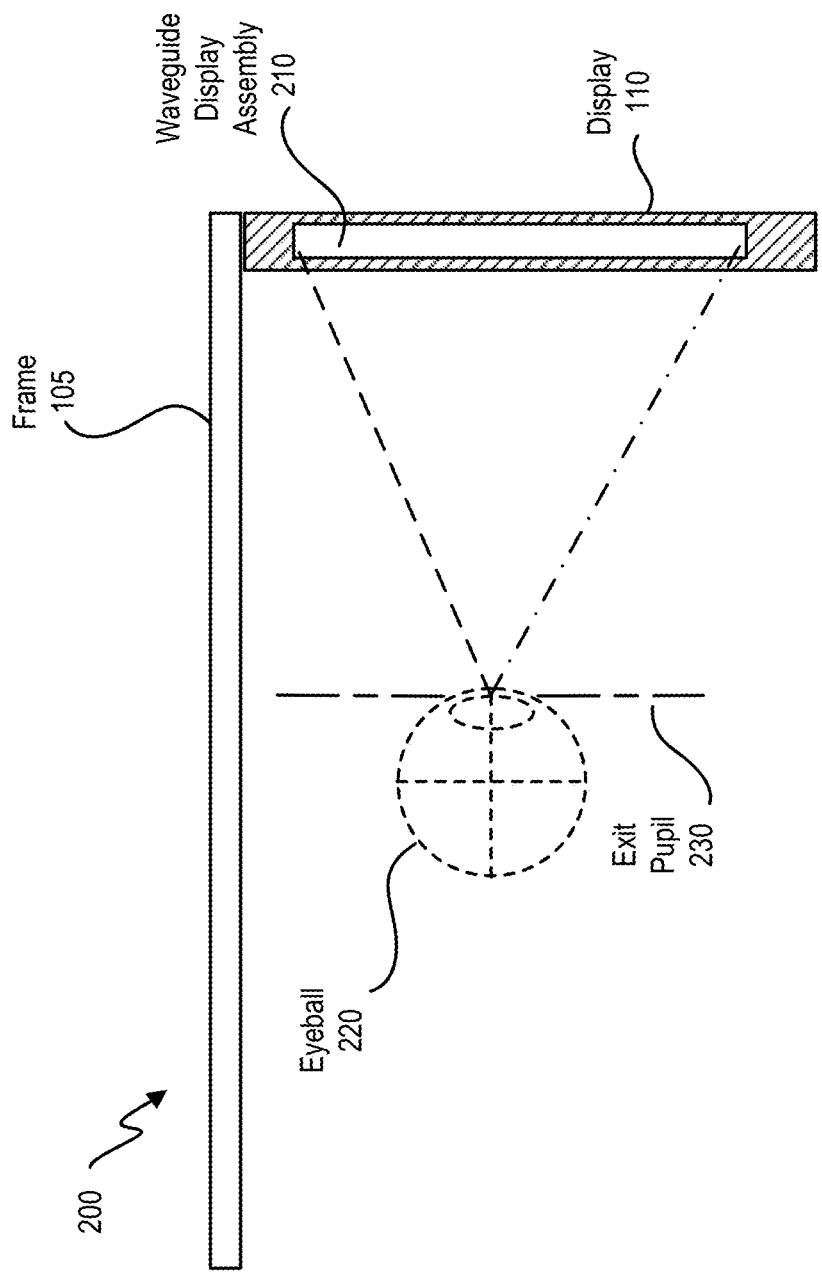
FIG. 2 is an embodiment of a cross section of the near-eye display, according to an embodiment herein.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

Processing materials to form waveguides generally involves producing recessed features. For example, one or more material layers of a waveguide may be subjected to surface relief grating, such as diffraction grating, to modify the optical properties of the waveguide. During surface relief grating, a plurality of nano-sized recessed features are formed on the material layer.

After recessed features are formed to achieve the desired optical properties (e.g., refractive index, absorption, etc.), the recessed features may be filled. To fill these recessed features, a sol-gel material can be applied. A sol-gel is a gel that can be characterized by its production process. For example, sol-gels are often characterized by the process from which they are made. A sol-gel process is a wet-chemical technique involving conversion of monomers into a colloidal solution ("sol") that acts as the precursor for an integrated network ("gel") of either discrete particles or network polymers.

Conventional sol-gel materials can be used to fill the recessed features. Conventional sol-gel materials, however, experience numerous challenges with filling recessed features, especially recessed features that are nano-sized and have high aspect ratios (e.g., the ratio of feature width to feature depth). For example, conventional sol-gels coatings form a conformal coating that tracks the topography of the underlying material without recessed features. Conventional sol-gels only vary in two dimensions with the thickness of the conventional sol-gel (the third dimension) remaining constant. The limited thickness variation of conventional sol-gel materials results in the sol-gel coatings being unable to adequately fill recessed features. For example, if a conventional sol-gel is applied to a material layer having nano-sized recessed features, the sol-gel coating will either trace the outline of the recessed feature, forming a conformal coating on the surface of the feature, or the sol-gel coating will partially (or completely) fill the recessed feature but form voids upon annealing. To fill recessed features, conventional sol-gels must be mixed with a nanoparticle source that provides support for the sol-gels. The addition of nanoparticles to support sol-gels not only increase the cost of preparing sol-gel coatings, but also increase production time.

To address these shortcomings of conventional sol-gel materials, examples of superconformal recessed feature fill sol-gel materials ("feature fill sol-gel material") are provided herein. A feature fill sol-gel material according to this disclosure is able to form a superconformal sol-gel coating in recessed features, including those that are nano-sized and have high aspect ratios, without the addition of support nano-particles. Moreover, the feature fill sol-gel material is able to be applied such that the resulting superconformal coating has a thickness that is less than the depth of the recessed features.

In addition to the superconformal characteristic of the feature fill sol-gel materials provided herein, the feature fill sol-gel materials provide for a lower annealing or densification temperature and duration. The reduction in annealing temperature and/or duration provides for increased flexibility during processing, and thereby can reduce production time and cost.

Referring now to FIG. 1A, a diagram of an embodiment of a near-eye display 100 is provided. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images with an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two fields of views towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminator 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
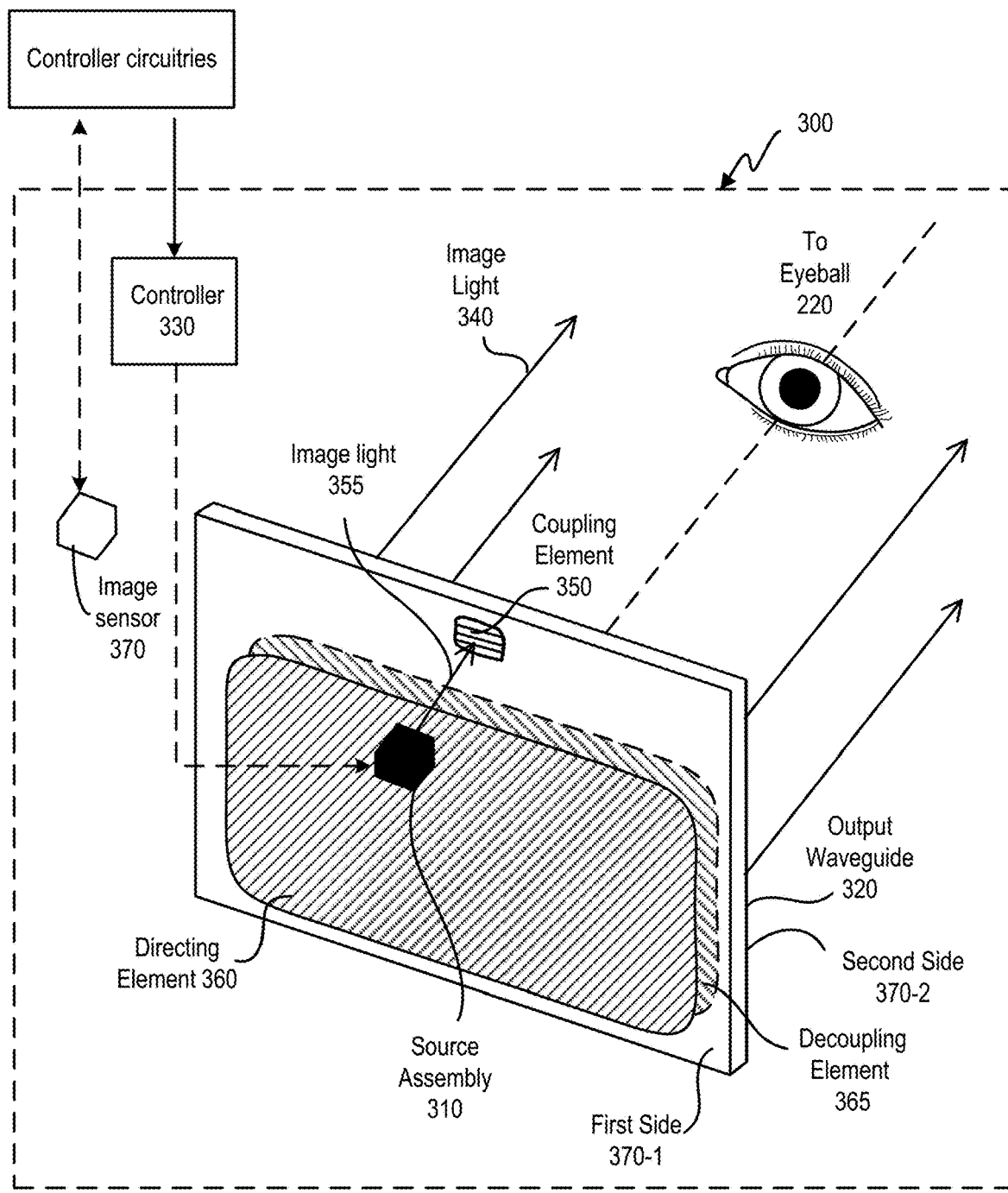
FIG. 3 illustrates an isometric view of an embodiment of a waveguide display with a single source assembly, according to an embodiment herein.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide displays separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of, e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
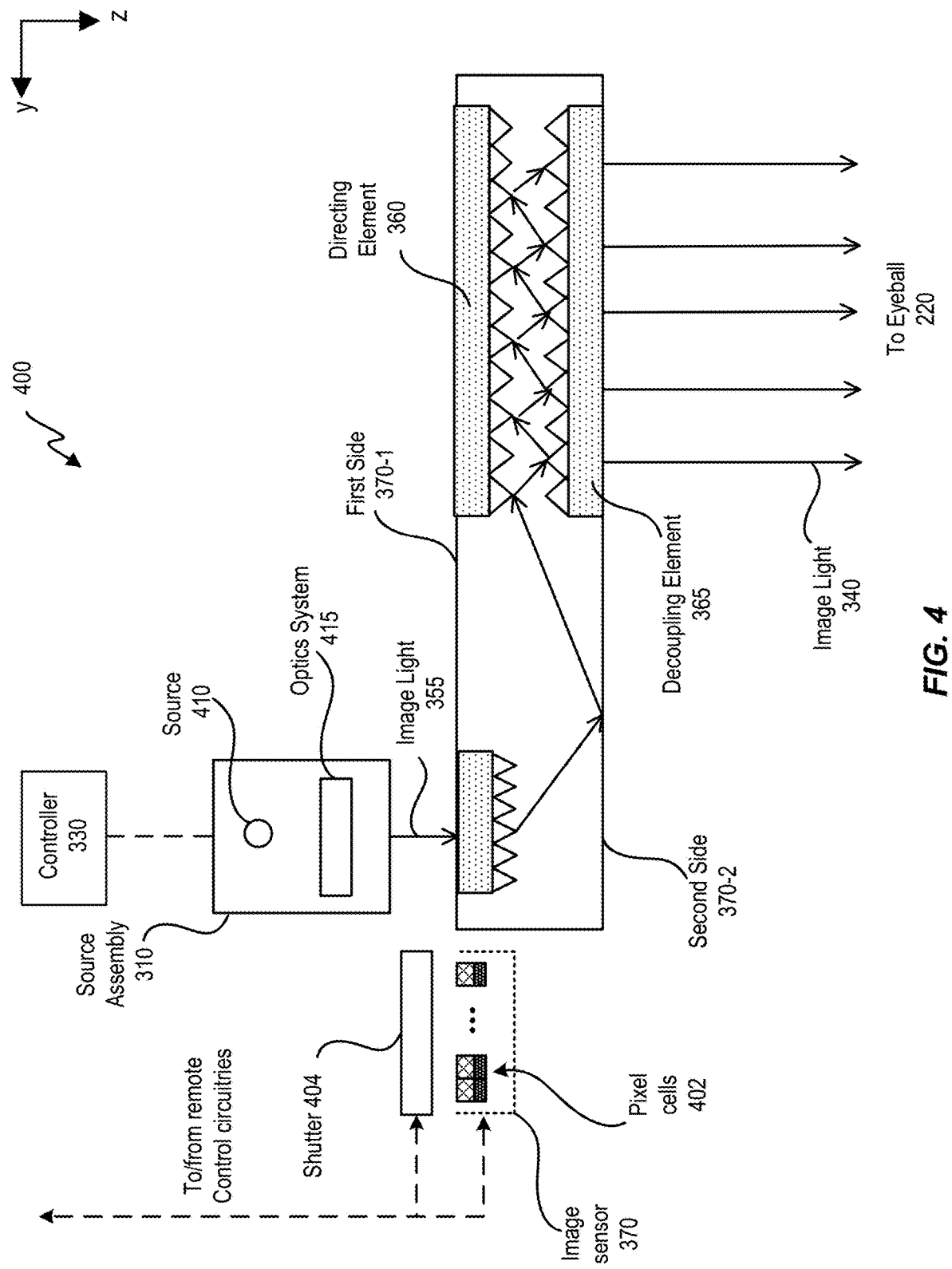
FIG. 4 illustrates a cross section of an embodiment of the waveguide display, according to an embodiment herein.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generates image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
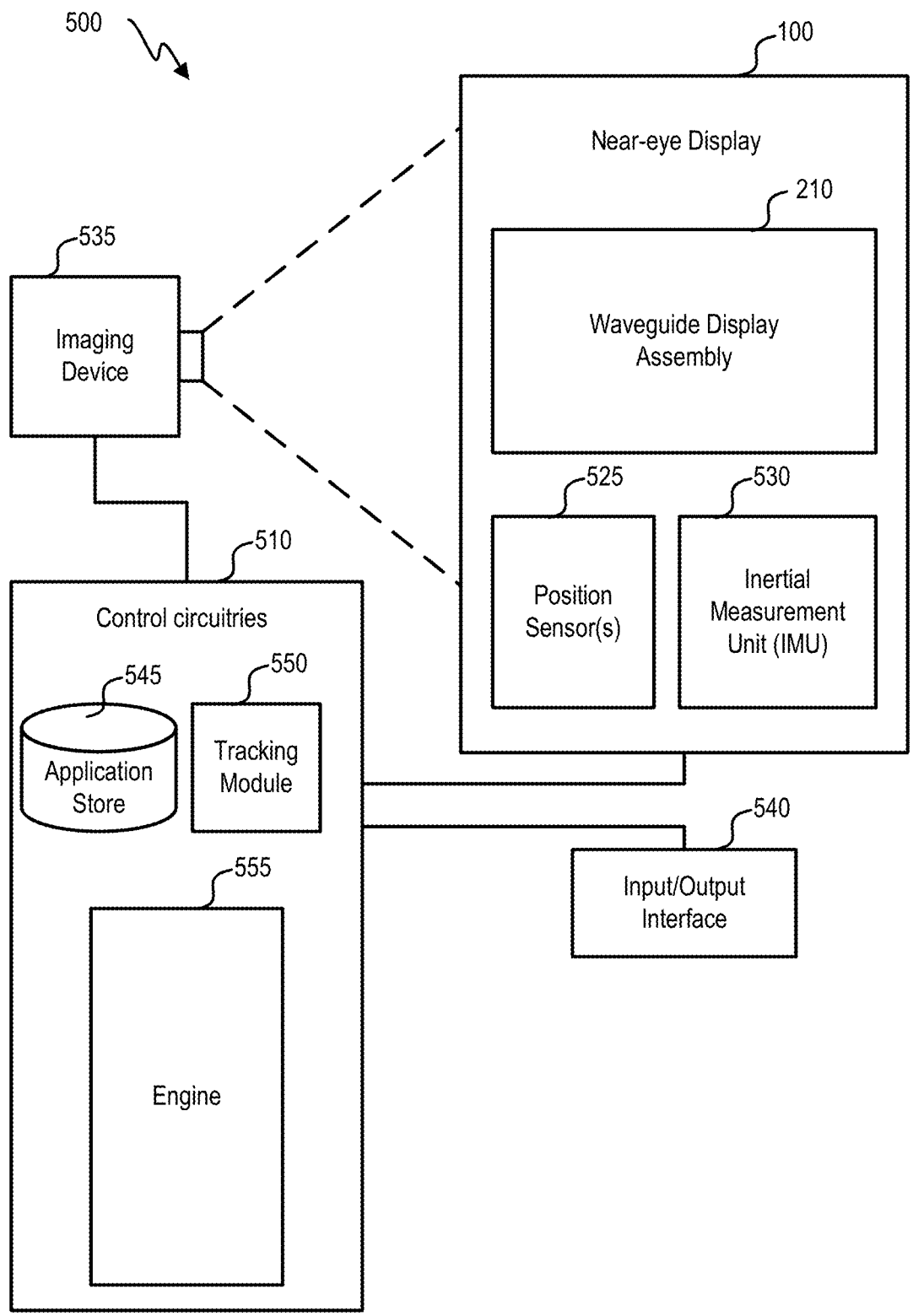
FIG. 5 is a block diagram of an embodiment of a system including the near-eye display, according to an embodiment herein.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535).

As discussed above, waveguides, such as the waveguide that is part of waveguide display assembly 210, are configured to direct image light to a user's eyes. To do so, the waveguide may include one or more materials having various optical properties. In addition to modifying the materials of the waveguide, various processes can be performed on the waveguide materials to modify and customize the optical properties of the materials. For example, surface relief grating (e.g., diffraction grating) can be etched into one or more layers of material forming the waveguide to modify light diffraction. During surface relief grating, a pattern of recessed features may be etched into a material layer of the waveguide, such as the coupling element 350, the directing element 360, and the decoupling element 365. The recessed features may contain nano-sized trenches, holes, vias, and/or various 1D, 2D, and 3D shapes that can provide a desired optical property to the material layer of the waveguide.

Figure 6A:
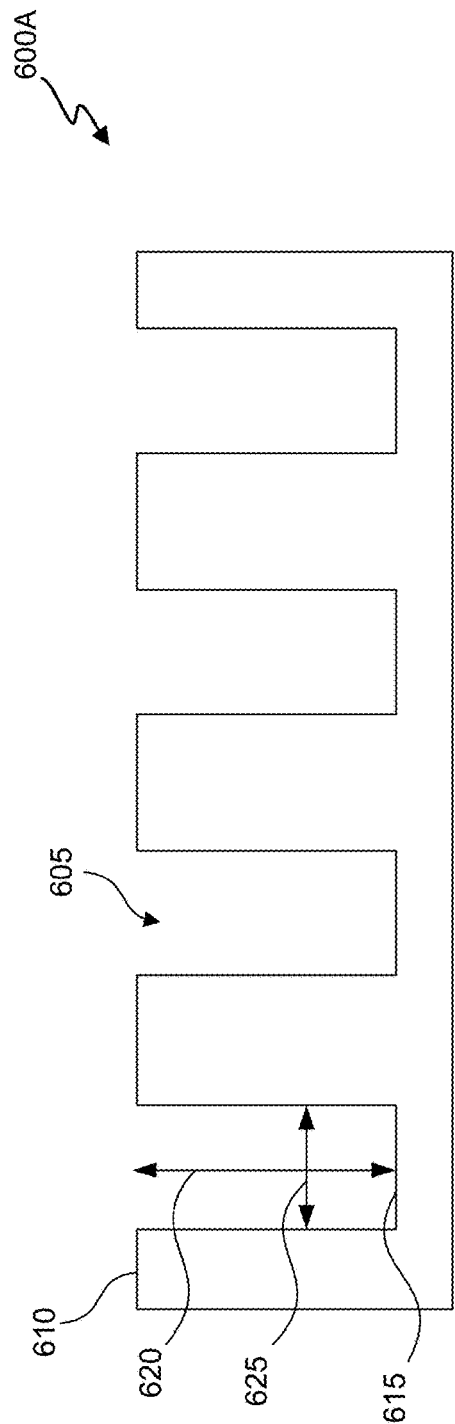
FIG. 6A illustrates a substrate having a plurality of recessed features, according to an embodiment herein.

Turning now to FIG. 6A, a substrate 600A having a plurality of recessed features 605 is provided. The substrate illustrated in FIG. 6A may be the material layer of a waveguide, such as the waveguide that is part of the waveguide display assembly 210. As depicted, the substrate 600A may include multiple recessed features 605. The recessed features 605 may be formed by one or more processing steps performed on the substrate 600A. For example, the plurality of recessed features 605 may be formed by subjecting the substrate 600A to a surface relief grating processes, such as a diffusion grating process. It should be appreciated that the plurality of recessed features 605 and the substrate 600A are depicted for illustrative purposes only and that the scale, proportion, shape, and quantity of recessed features 605 may be different from reality.

The recessed features 605 may be formed in a recess formed in a surface 610 of the substrate 600A. The surface 610 may be a top or external surface of the substrate 600A. The recessed features 605 may extend from the surface 610 to a bottom surface 615 at a depth 620. The depth 620 may extend from the surface 610 of the substrate 600A into the bulk of the substrate 600A. The recessed feature 605 may also have a width 625. In some embodiments, the recessed features 605 may be nano-scaled. For example, the recessed features 605 may have a depth 620 ranging from 50 nm to 500 nm, from 150 nm to 400 nm, or 250 nm to 350 nm. The width 625 of the recessed features 605 may range from 5 nm to 300 nm, from 10 nm to 250 nm, or from 20 nm to 100 nm. In other examples, the ranges of the depth 620 and the ranges of the width 625 of the recessed features 650 may differ.

The recessed features 605 may have a high aspect ratio. For example, the aspect ratio of the recessed features 605 may range from 1 to 10, from 1.5 to 9.5, or from 2 to 9. In other examples, the range of aspect ratio of the recessed features 605 may vary. The aspect ratio, depth 620, and width 625 may vary depending on the type of recessed feature formed. For example, in some embodiments the recessed features 605 may be or include trenches, holes, vias, and/or various 1D, 2D, and 3D shapes. The form and shape of the recessed features 605 may depend on the desired optical property of the material layer of the waveguide.

Figure 6B:
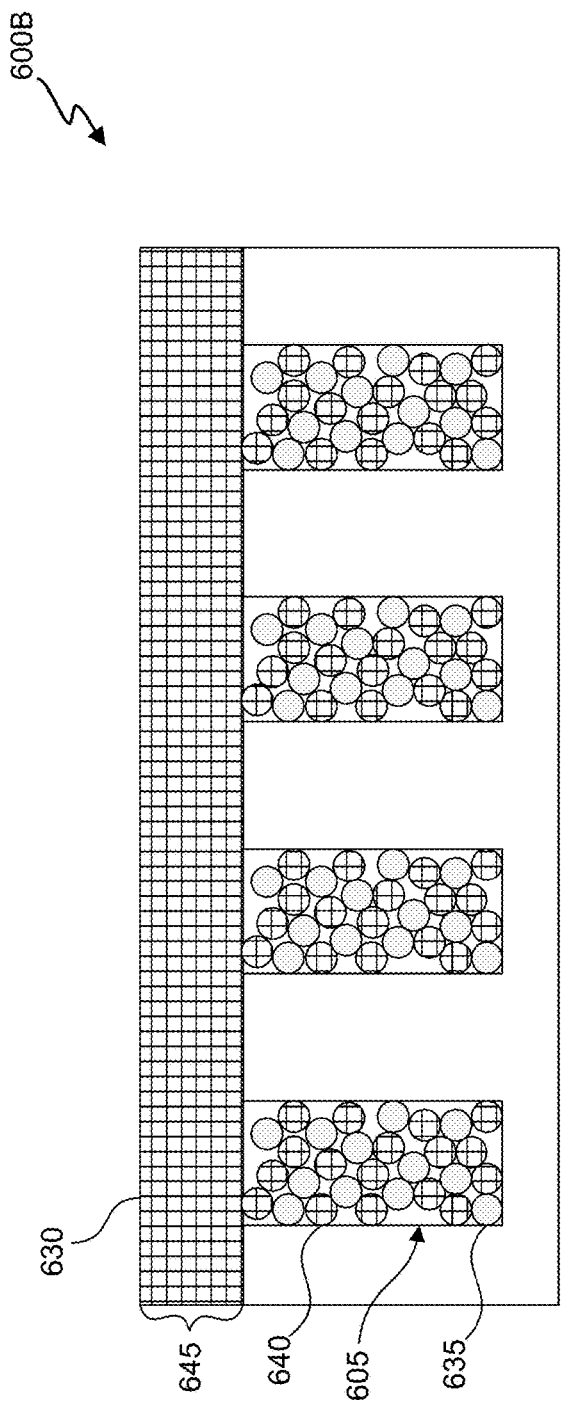
FIG. 6B illustrates the substrate of FIG. 6A having a conventional sol-gel material applied to the plurality of recessed features, according to an embodiment herein.

After forming the plurality of recessed features 605, a sol-gel material may be applied to fill the recessed features 605. Referring now to FIG. 6B, an illustration of a substrate 600B having a conventional sol-gel material 630 applied to a plurality of recessed features is provided. FIG. 6B illustrates filling the plurality of recessed features 605 from FIG. 6A with a conventional sol-gel material 630. FIG. 6B illustrates the application of conventional sol-gel material 630 to the recessed features 605 prior to an annealing process.

The conventional sol-gel material 630 may be or include a sol-gel. The conventional sol-gel material 630 may be applied to the substrate 600B to fill the recessed features 605. As illustrated, once applied, the conventional sol-gel material 630 may fill the recessed features 605 and extend on the surface 610 of the substrate 600B to a thickness 645.

The conventional sol-gel material 630 may be composed of a solution including a metal oxide precursor. As such, the conventional sol-gel material 630 may include a first component 635 and a second component 640. The first component 635 may be a metal oxide and the second component 640 may include precursor ligands and solvent.

To form a sol-gel coating, the conventional sol-gel material 630 may be subjected to an annealing process. During annealing, second component 640, including the precursor ligands and solvent, are removed to fully condense the first component 635 to form an oxide film. Condensation of the conventional sol-gel material 630 results in densification and in some cases crystallization. The anneal process, however, often presents challenges to the conventional sol-gel material 630.

Referring now to FIGS. 7A and 7B an example challenge that arises from applying conventional sol-gel materials to recessed features is provided. FIG. 7A illustrates a substrate 700 during an annealing process. As shown, the substrate 700 has a conventional sol-gel material 730 applied to a plurality of recessed features 705. The conventional sol-gel material 730 may include a first component 635 and a second component 640. FIG. 7A may be similar or the same as FIG. 6B except that it is illustrating the substrate 700 and the conventional sol-gel material 730 during an annealing process.

As noted above, during an annealing process, the conventional sol-gel material 730 condenses and densifies. As the conventional sol-gel material 730 densifies, an integrated network of either discrete particles or a network polymer (depending on the composition) may be formed, thereby forming a conformal coating. As part of the densification process, the second component 740, including precursor ligands and solvent, may shift or move out of the recessed features 705. As illustrated by movement arrow 750, the second components 740 may shift or move out of the recessed feature 705 during the annealing processes. The movement arrow 750 of the second components 740 may be due to evaporation of the second components 740 or a chemical reaction in which the second components 740 are consumed.

During the annealing process, the first component 735 densifies (e.g., shrinks) and forms an integrated network about the surface of the recessed features 705. Turning now to FIG. 7B, the substrate 700 is provided after the annealing process. As illustrated, after the second component 740 moves out of the recessed features 705, voids 755 may be formed. The first component 735 may remain along the surface of the recessed feature 705 forming a conventional sol-gel coating. The higher the aspect ratio of the recessed features 705, the more pronounced formation of voids 755 may be. The formation of voids 755 is a key challenge with using the conventional sol-gel material 730 to form a conformal coating for recessed features, such as those described herein. As such, the conventional sol-gel material 730 is not typically used for forming super-conformal coatings on nano-sized, high aspect ratio recessed features.

Figure 8A:
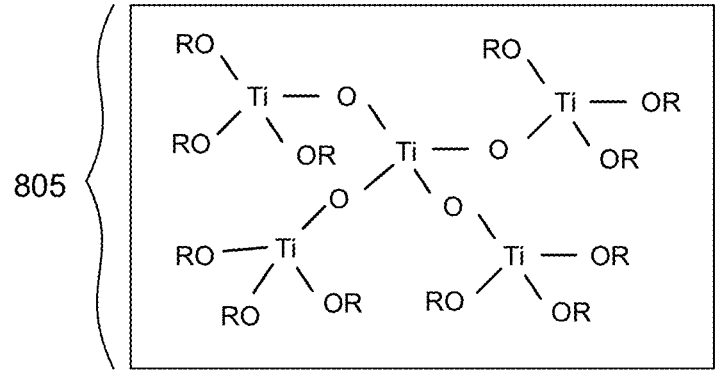
FIG. 8A illustrates an example formulation of a conventional sol-gel material prior to annealing.

The challenges faced by conventional sol-gel materials, such as the sol-gel materials 630 and 730, is due in part to the formulation of the sol-gel. Referring now to FIGS. 8A, an example formulation 800A of a conventional sol-gel material prior to annealing is provided. As illustrated, the formulation of a conventional sol-gel material includes a metal oxide precursor. The metal oxide precursor includes multiple precursor ligands, represented by "—RO". The precursor ligands (—RO) are used to form a coordination complex that allows bonding between the metal and oxygen molecules upon densification.

Figure 8B:
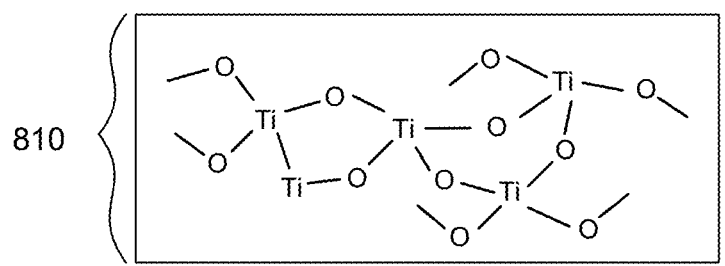
FIG. 8B illustrates an example formulation of the conventional sol-gel material of FIG. 8A after annealing.

FIG. 8B illustrates an example formulation 800B of the conventional sol-gel material after annealing. As shown, annealing removes the precursor ligands, allowing for bonding between the oxygen and metal (depicted as titanium) molecules. Upon removal of the precursor ligands, a condensed metal oxide network is formed.

As illustrated, prior to annealing, the conventional sol-gel material has a thickness illustrated by 805 in FIG. 8A. However, after annealing, the conventional sol-gel material has a thickness of illustrated by 810 in FIG. 8B. Thus, the thickness after annealing is less than the thickness of the conventional sol-gel material prior to annealing. Shrinkage of the conventional sol-gel material also contributes to the void formations discussed with respect to FIGS. 7A and 7B. Shrinkage of the conventional sol-gel material is due to the condensation and densification resulting from the removal of the precursor ligands. Typically, conventional sol-gel materials are observed to shrink between the initial application and complete annealing to form the sol-gel film by more than 60%, and at times around 90%. Thus, sol-gel coatings made from conventional sol-gel materials lead to high thickness variations during annealing, and formation of voids in recessed features due to shrinkage.

To address the voiding and shrinkage issues experienced by conventional sol-gel materials nano-particles can be added for support. For example, nano-particles are added to form a support structure for the conventional sol-gel material during and after annealing. The support structure formed by the nano-particles, allows the conventional sol-gel coating to be formed on the structure, thereby minimizing large void formation within the recessed features as the support structure spans the depth and width of the recessed feature.

The addition of nano-particles, however, can be costly and time consuming. Moreover, the addition of nanoparticles with a diameter similar to the width of the recessed features can lead to uneven distribution of the nanoparticles across features of different widths and along the depth of the features. This negatively influences the optical performance of the waveguide.

In some embodiments, the formulations of conventional sol-gel materials may contain multicore precursors or pre-condensed gels to lower the shrinkage of the conventional sol-gel material during and after annealing. However, the composition of these materials (e.g., the conventional sol-gel material containing the multicore precursors or pre-condensed gels) is typically unstable and tends to form nanoparticles in solution over time. A key cause of the void formation and shrinkage of conventional sol-gels stems from the instability of molecular oxide clusters of the conventional sol-gel materials toward water and molecular oxygen. Due to this instability, the molecular oxide clusters of conventional sol-gel materials tend to aggregate over time. Once aggregates of oxide clusters and nanoparticles are fully formed, a quality superconformal sol-gel coating within recessed features is not possible in the absence of a support resin (such as by the addition of nano-particles). Moreover, even with the support nano-particles, the resulting sol-gel coating is prone to have poor mechanical properties (e.g., the deposit might be brittle and may be easily removed upon contact).

To address the shrinkage and voiding tendencies of conventional sol-gel materials, feature fill sol-gel materials are described herein. The feature fill sol-gel materials allow for formation of a superconformal sol-gel coating in recessed features, even nano-sized recessed features having high aspect ratios, without forming voids. The superconformal sol-gel coatings formed by the feature fill sol-gel materials may be superconformal optical coatings. One example feature fill sol-gel material may be a low-shrinkage sol-gel material. As used herein, low-shrinkage may mean that the sol-gel material shrinks less than 60%, less than 50% or less than 40% during an annealing process. Shrinkage may include volumetric shrinkage as well as thickness shrinkage of the sol-gel material. The feature fill sol-gel materials may also be stable under ambient conditions for a duration of more than 5 days. Importantly, examples of feature fill sol-gel materials may not form discrete particles during an annealing process within the recessed feature. As noted above, discrete particles can be formed by aggregation of oxide clusters which can form due to instability around water and molecular oxygen. Formation of these discrete particles is a cause of void formation within conventional sol-gel materials in recessed features and thus prevention of particulate formation can also prevent void formation.

The feature fill sol-gel materials provided herein may be composed of a molecular titanium precursor ("titanium precursor"). The titanium precursor may include elemental titanium in various states of oxidation. For example, the titanium precursor may be or include Titanium(III) or Titanium(IV). In a preferred embodiment, the titanium precursor may include Titanium(IV).

The elemental titanium may be part of or include a titanium metal oxo complex. For example, the elemental titanium may be part of a titanium oxo mononuclear species. Depending on the oxidation state, the titanium oxo mononuclear species may be a Titanium(III) oxo mononuclear species or a Titanium(IV) oxo mononuclear species. In an example embodiment the titanium oxo mononuclear species may be a Titanium(IV) oxo mononuclear species such as oxy-titanyl. In other examples, the titanium oxo-mononuclear species may be or include one or more Titanium(IV) hydroxide mononuclear species. In still further examples, the elemental titanium may be part of a multinuclear network of Titanium(IV) hydroxide instead of a titanium oxo mononuclear species. The titanium metal oxo complex may include one or more oxo ligands. Oxo ligands (e.g., $O^{2-}$) can be bound to one or more metal centers, and in some cases, function as bridging ligands to help stabilize high oxidation states of a metal.

Referring now to FIG. 9A, an example formulation 900A of a titanium oxo mononuclear species is provided. FIG. 9A provides two different configurations of formulation 900A. As shown, the example formulation of 900A includes a oxy-titanyl. Using a titanium oxo mononuclear species may be advantageous because the titanium oxo mononuclear species can be readily condensed into a stable Titanium(IV) oxide network at low temperature (e.g., less than 300° C.) and display reduced shrinkage during condensation (less than 60% shrinkage), as opposed to conventional sol-gel materials. For example, as illustrated by the formulation 800A, the titanium in FIG. 8A is single bonded to four oxygen molecules. In contrast the titanium illustrated in formulation 900A may contain one or more oxo moieties that form a Titanium(IV) oxo precursor that is less likely to induce formation and aggregation of discrete grains during condensation, and thus can prevent void formation during and after annealing.

In some embodiments, the titanium precursor includes an inorganic ligand. The inorganic ligand may be added to the titanium oxo mononuclear species to form the titanium precursor. The inorganic ligand may include a sulfate ligand, a phosphate ligand, a selenium oxide ligand, or a tellurium oxide ligand. Upon addition of the inorganic ligand to the titanium oxo mononuclear species, the components may react to form the titanium precursor. In example embodiments, the titanium oxo mononuclear species may include oxy-titanyl and the inorganic ligand includes a sulfate ligand or a phosphate ligand. In such examples, titanium oxo mononuclear species may react with the inorganic ligand to form a titanium precursor including a Titanium(IV) oxysulfate or a Titanium(IV) oxyphosphate, respectively.

Referring now to FIG. 9B, an example formulation 900B of a titanium precursor is provided. As illustrated, the formulation 900B is a Titanium(IV) oxysulfate. The formulation 900B may be formed by reacting an oxy-titanyl (such as the formulation 900A) with a sulfate ligand. The bonding structure of the formulation 900B may form a type of interpenetrating scaffold that prevents shrinkage of the feature fill sol-gel material during application and annealing processes.

The titanium precursor used to form the feature fill sol-gel material may depend on the titanium oxo mononuclear species and the inorganic ligand used. In example embodiments, the titanium precursor may include Titanium(IV) oxyacetylacetonate, Titanium(IV) oxysulfate, Titanium(IV) oxyphosphate or Titanium(IV) oxychloride.

In some embodiments, feature fill sol-gel materials may include more than one titanium precursor. For example, a feature fill sol-gel material may include a first titanium precursor that may be combined with a second titanium precursor. In an example embodiment, the first titanium precursor may be a Titanium(IV) oxysulfate and the second titanium precursor may be a Titanium(IV) oxysulfate. In other example embodiments, the first titanium precursor may be a Titanium(IV) oxyphosphate and the second titanium precursor may be a Titanium(IV) oxyphosphate. In still other example embodiments, the first titanium precursor may be a Titanium(IV) oxysulfate and the second titanium precursor may be a Titanium(IV) oxyphosphate. In should be appreciated that any combination of two or more titanium precursors may be used.

In some embodiments, a second titanium precursor may be added to tune the optical properties of the resulting superconformal so-gel coating. In some embodiments, a first titanium precursor may be used to form the support structure (e.g., to retain the feature fill character) while a second titanium precursor is used to modify the optical properties of the resulting superconformal sol-gel coating. For example, in Titanium(IV) oxysulfate can be used to form a support scaffold for the feature fill sol-gel material while titanium (IV) oxyacetylacetonate is added to achieve a desired refractive index (RI) for the superconformal sol-gel coating. The addition of the second titanium precursor can be used to modify the RI, transparency, and degree of shrinkage upon anneal of the superconformal sol-gel coating. It should also be understood that the titanium precursor can also be selected to achieve desired optical properties in the superconformal sol-gel coating.

Modification of the optical properties of the superconformal sol-gel coating may be tuned not only by the selection of a specific titanium precursor, but also by the ratio of a second titanium precursor to a first titanium precursor. For example, the ratio of a first titanium precursor to a second titanium precursor may range from 0.25:1 to 10:1 by weight.

To form an example feature fill sol-gel material, the titanium precursors may be dissolved with a solvent to form a solution. The solvent may include water and/or one or more solvent belonging to the class of propylene glycols, ethylene glycols, lactones, ketones, alcohols, diols acetates and ethers. In some embodiments, one or more additives may also be included to form the solution. For example, additives may include an acid, a base, a peroxide, a surfactant, a cross-linker, a flexibilizer additive, a toughener additive, a polymer, or an additional solvent. In an example embodiment, the titanium precursors may be combined with an acid, such as nitric acid sulfuric acid, sulfamic acid, hydrochloric acid, hydrofluoric acid, hydrobromic acid, perchloric acid, phosphoric acid, hydroboric acid, formic acid, acetic acid, or propionic acid.

The solvent may be added to the titanium precursor(s) or the titanium precursor(s) plus the additives to achieve a titanium complex concentration. In some embodiments, a titanium concentration may be defined as the total mass of Titanium atoms over the total mass of the solution; or alternatively, as the total mass of Titanium complexes (e.g., the mass of the Titanium atoms plus the ligands in the first coordination sphere) over the total mass of the solution. In some embodiments, the titanium complex concentration may range from 0.5 to 50% w/w, from 1 to 30% w/w, from 5 to 25% w/w, or from 10 to 20% w/w, depending on the titanium precursor(s), additives, and solvents used to form the feature fill sol-gel material.

Once the example feature fill sol-gel material is prepared, the feature fill sol-gel material may be applied to a substrate. As described herein, the substrate may be a material layer for a waveguide having recessed features, such as the substrate 600A having recessed features 605. The feature fill sol-gel material may be applied onto the substrate to fill the recessed features by known application processes. For example, the feature fill sol-gel material may be applied be one or more of a spin-coating process, dip-coating process, spray-coating process, ink-jet printing process, screen-printing process, and/or contact-printing process.

In some embodiments, after application of the feature fill sol-gel material onto the substrate, the feature fill sol-gel material may be condensed. For example, the feature fill sol-gel material may be condensed via thermal condensation, photo-condensation, or a combination of thermal and photo-condensation. For example, the feature fill sol-gel material may be condensed thermally (e.g., annealing) or photo-chemically. In examples where the feature fill sol-gel material condenses photo-chemically, the feature fill sol-gel material may contain Titanium and hydrogen peroxide and/or a Titanium-acetylacetonate complex that may condense upon excitation in the near-UV and UV regions of the light spectrum. In examples where the feature fill sol-gel material condenses thermally, the feature fill sol-gel may condense via one or more annealing processes. Condensation via anneal is described in greater detail herein. Depending on the formulation of the feature fill so-gel material, combining photo- and thermal-curing may allow for tuning of the optical properties of the resulting superconformal sol-gel coating or locally vary condensation degree when forming the superconformal sol-gel material.

Figure 10A:
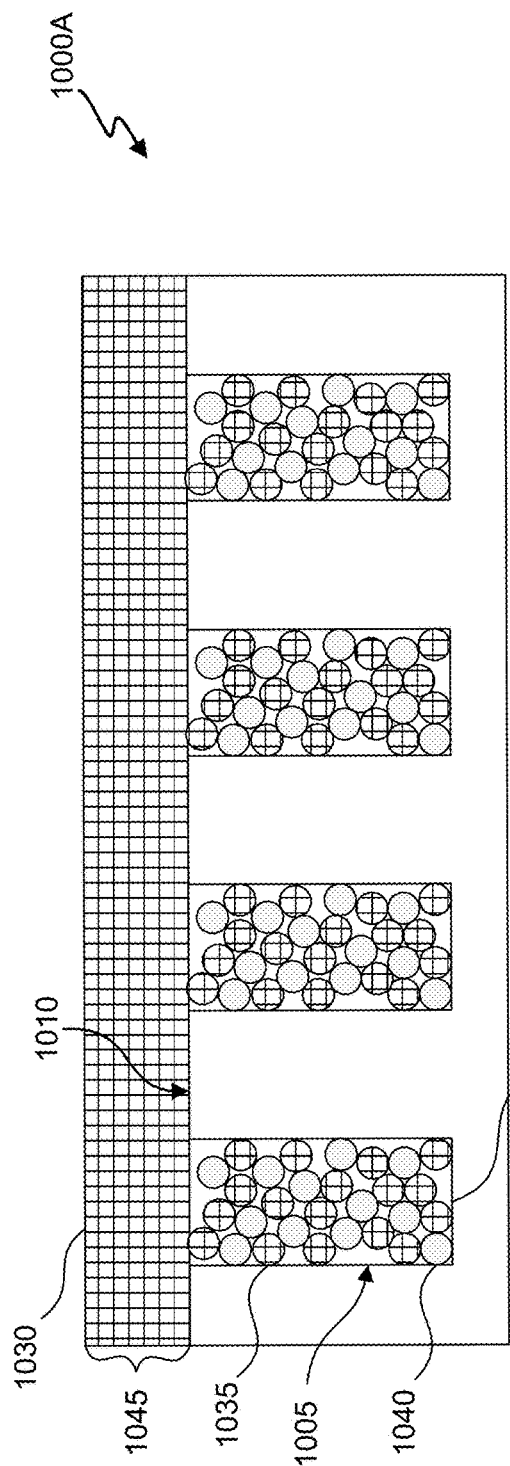
FIG. 10A illustrates the recess-fill character of the feature fill sol-gel material provided herein prior to annealing, according to an embodiment herein.
Figure 10B:
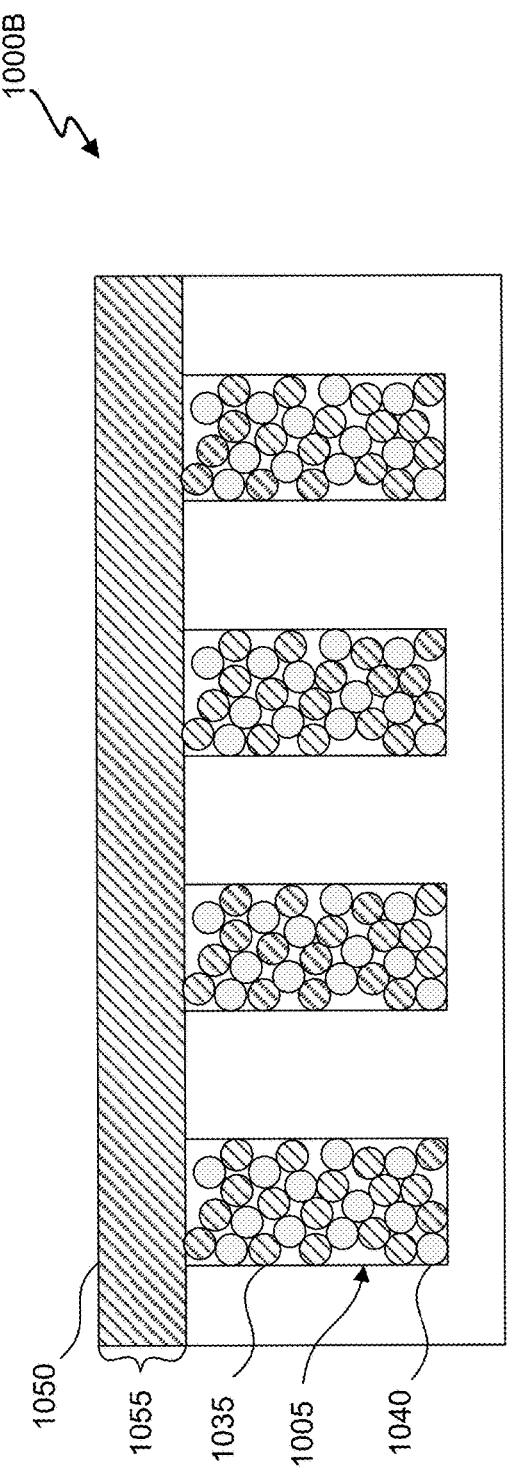
FIG. 10B illustrates the recess-fill character of the feature fill sol-gel material provided herein after annealing, according to an embodiment herein.

FIGS. 10A and 10B illustrate the recess filling character of the feature fill sol-gel materials provided herein, during application and after annealing. FIG. 10A illustrates a substrate 1000A having an example feature fill sol-gel material 1030 applied thereon to fill a plurality of recessed features 1005. The feature fill sol-gel material 1030 applied to substrate 1000A may be depicted prior to an annealing process. As shown, the feature fill sol-gel material 1030 may be applied to fill the recessed features 1005 completely. Completely filing the recessed features 1005 may mean filling the recessed features 1005 from a bottom surface 1015 to a top surface 1010. In some embodiments, the feature fill sol-gel material 1030 may be applied to a thickness 1045 on top of the top surface 1010.

The feature fill sol-gel material 1030 may be applied to achieve a thickness 1045 on the top surface 1010 of the substrate 1000A. For example, the thickness 1045 of the feature fill sol-gel material 1030 prior to annealing may range from 1 to 1,000 nm, from 10 to 500 nm, from 50 to 250 m, or from 100 to 250 nm.

As illustrated, the feature fill sol-gel material 1030 may include a titanium precursor formed from a titanium oxo mononuclear species 1035 and an inorganic ligands 1040. Unlike the conventional sol-gel material, such as the conventional sol-gel material 630, when annealed, the titanium oxo mononuclear species 1035 and the inorganic ligands 1040 remain in the recessed features 1005. In an example embodiment, the feature fill sol-gel material 1030 may be formed from a titanium precursor including Titanium(IV) oxysulfate. Titanium(IV) oxysulfate may provide a low shrinkage scaffold that only experiences 40-60% shrinkage between application of the feature fill sol-gel material 1030 and densification (e.g., via annealing) to form the superconformal sol-gel coating.

Turning now to FIG. 10B, a substrate 1000B having a superconformal sol-gel coating 1050 formed thereon is provided. The superconformal sol-gel coating 1050 may be formed by annealing the feature fill sol-gel material 1030. As noted above, the feature fill sol-gel material 1030 may be subjected to one or more annealing processes to densify and/or consolidate the feature fill sol-gel material 1030 to form the conformal sol-gel coating 1050. In some embodiments, the conformal sol-gel coating 1050, also referred to as the superconformal sol-gel coating 1050, may be formed by achieving full densification of the feature fill sol-gel material 1030. As used herein, full densification can mean the a maximum degree of densification achievable by the feature fill sol-gel material 1030. The maximum degree of densification may vary depending on the composition of the feature fill sol-gel material 1030. In some embodiments, maximum densification may be considered when the superconformal sol-gel coating 1050 density or RI does not continue to increase even if annealing time or temperature are increased.

In some cases, the annealing process may also be used to adjust the RI and tune transparency properties of the resulting superconformal sol-gel coating 1050. Conventionally, the annealing temperature required for full densification of a conventional sol-gel coating depends on the chemical nature of the precursor used and the structure of the target oxide. Typically, however, the anneal temperature is greater than 500° C. For example, full densification for a conventional titanium dioxide sol-gel coating made from monomeric precursors is observed at or around 600° C.

An unexpected result of the feature fill sol-gel material 1030 including titanium precursors is a lower densification temperature. As densifications often occurs during an annealing process, a lower densification temperature can mean a lower annealing temperature. For example, a feature fill sol-gel material 1030 including Titanium(IV) oxysulfate may fully densify at a temperature below 300° C. Lower densification temperatures may lower the annealing temperature for the superconformal sol-gel coating process. Lowering the thermal processing temperature may reduce cost and time required to produce a superconformal sol-gel coating. Moreover, the lower thermal processing temperature may increase the compatibility of a superconformal sol-gel coating process with adjacent materials and processes. For example, a material layer for a waveguide may include other coatings in addition to the superconformal sol-gel coating. Conventionally, however, the addition of other coatings may have been limited due to high annealing temperatures that could damage the other coatings. Because the feature fill sol-gel material 1030 densifies at a lower temperature, the other coatings can be present during the annealing process without concerns of thermal damage.

The feature fill sol-gel materials provided herein may have an annealing temperature that is lower than conventional sol-gel materials. For example, the feature fill sol-gel material 1030 may have an annealing temperature of equal to or less than 300° C., equal to or less than 250° C., equal to or less than 200° C., equal to or less than 150° C., equal to or less than 100° C., or equal to or less than 90° C. The annealing temperature may depend on the titanium precursor(s), solvent, and/or additives used to prepare the feature fill sol-gel material.

The annealing process(es) for the feature fill sol-gel materials provided herein may also have a reduced duration. For example, the feature fill sol-gel material 1030 may achieve complete densification within a duration of less than 30 minutes, less than 20 minutes, or less than 10 minutes.

The feature fill sol-gel material 1030 exhibits lower shrinkage after application and annealing than conventional sol-gel materials. The reduction in shrinkage may be due to the titanium precursor being formed from the titanium oxo mononuclear species 1035 and the inorganic ligand 1040. The titanium oxo mononuclear species 1035 and the inorganic ligand 1040 may experience minimal movement during the one or more annealing processes. The reduction in movement, and thereby resulting in reduced shrinkage, may be due to the preformation of the oxo-ligand within the titanium precursor. The oxo-ligand may be formed by the addition and reaction of the inorganic ligand 1040 to the titanium oxo mononuclear species 1035. The addition of the inorganic ligand 1040 to the titanium oxo mononuclear species 1035 may prevent the feature fill sol-gel material 1030 from segregating into particulates inside the recessed features 1005 during application and annealing. Both of these material properties, low shrinkage and resistance toward particulate formation, provides for formation of the superconformal sol-gel coating 1050 within the recessed features 1005 without forming voids during annealing, even within nano-sized, high aspect ratio recessed features.

The reduction in shrinkage of the feature fill sol-gel material 1030 can provide for minimal shrinkage of a thickness 1055 of the superconformal sol-gel coating 1050. For example, the thickness 1055 of the superconformal sol-gel coating 1050 may be the same or similar to the thickness 1045 of the feature fill sol-gel material 1030. In some embodiments, the thickness 1055 may be within 5% of the thickness 1045, within 20% of the thickness 1045, within 40% of the thickness 1045, within 50% of the thickness 1045, within 60% of the thickness 1045, or within 70% of the thickness 1045. In some embodiments, the thickness 1055 of the superconformal sol-gel coating 1050 may be less than 500 nm, less than 250 nm, less than 100 nm, less than 50 nm, or less than 25 nm.

The superconformal sol-gel coating 1050 may have improved optical properties. For example, the superconformal sol-gel coating 1050 may have a RI, measured via ellipsometry, in a range from 1.5 to 2.5, from 1.65 to 2.2, or from 1.75 to 2.0. The superconformal sol-gel coating 1050 may have an absorption of less than 0.1% per 150 nm thickness. The superconformal sol-gel coating may also have increased surface uniformity such that the peak to valley height difference of the superconformal sol-gel coating around the features varies by less than 30 nm, less than 20 nm, or less than 15 nm.

The recess fill character of the superconformal sol-gel coating 1050 may maintain even when the recessed features 1005 have high aspect ratios and are nano-sized, such as is described with respect to recessed features 605. For example, the superconformal sol-gel coating 1050 may fill the recessed features 1005, without forming voids, when the recessed features 1005 have a width ranging from 1 nm to 500 nm, a depth ranging from 1 nm to 2000 nm, or have an aspect ratio that is equal to or greater than 2.

EXAMPLES

Comparative Examples 1 and 2

The following comparative examples illustrate the lack of recessed feature fill characteristics of a conventional sol-gel formed from Titanium(IV) tetraisopropoxide.

Comparative Example 1

Titanium(IV) tetraisopropoxide and nitric acid were dissolved in 1-methoxy-2-propanol (PGME) solvent to form a conventional sol-gel material. The resulting sol-gel material was coated onto a silicon substrate that had been cleaned with an oxygen gas plasma. The substrate contained nano-sized trenches ranging from 15 to 100 nm wide and 220 nm deep. That is, the recessed feature aspect ratio ranged from ~1.5 to ~9.5. The substrate was then annealed at 90, 200, 330 and 600° C. to form a conventional sol-gel coating. The thickness and RI of the conventional sol-gel coating was measured via ellipsometry. As shown in Table 1 (provided below), it was found that the conventional sol-gel coating shrank by >85% during the annealing process. Furthermore, the substrate was cross-sectioned and the quality of the trench-fill by the sol-gel was determined via a scanning electron microscope (SEM). It was found that the conventional sol-gel coating did not fill the trenches under any annealing temperature. Instead, the trenches were only partially filled by the conventional sol-gel coating and contained voids. This result exemplifies the inability of conventional sol-gel materials to superconformally fill of nano-sized features.

Figure 11A:
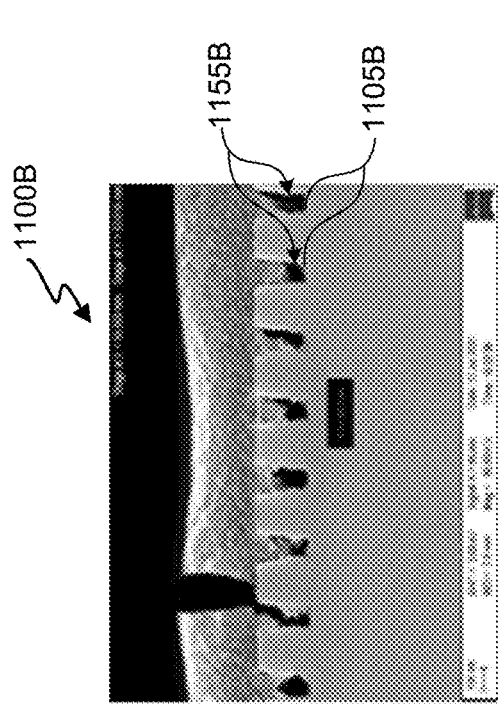
FIGS. 11A-11B depict images captured by a SEM after annealing according to comparative example 1.
Figure 11B:
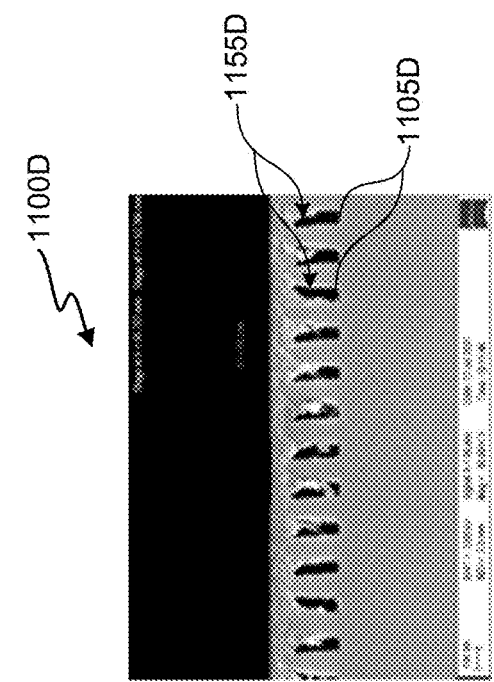

FIGS. 11A and 11B provide images captured by the SEM after annealing. Image 1100A in FIG. 11A shows recessed features 1105A filled with the sol-gel after annealing to a temperature of 90° C. Image 1100B of FIG. 11B shows recessed features 1105B filled with the sol-gel after annealing to a temperature of 330° C. As shown, the sol-gel did not fill the trenches under any annealing temperature. As shown, voids 1155A, visible as the black areas in the image 1100A were formed in the trenches the 1105A. Similarly, voids 1155B, visible as the black areas in the trenches 1105B were formed during annealing.

Comparative Example 2

Titanium(IV) tetraisopropoxide and nitric acid were dissolved in PGME solvent to form a conventional sol-gel material. The conventional sol-gel material was coated onto a silicon substrate that had been coated with a 5 nm-thick TiO2 layer via atomic layer deposition (ALD) and cleaned with an oxygen gas plasma. The substrate contained nano-sized trenches ranging from 15 to 100 nm wide. The substrate was then annealed at 90, 200, 330 and 600° C. to form a conventional sol-gel coating. The thickness and RI of the conventional sol-gel coating was measured via ellipsometry. As shown in Table 1, it was found that the conventional sol-gel material shrank by >85% during the annealing process. Furthermore, the substrate was cross-sectioned and the quality of the trench-fill by the conventional sol-gel coating was determined via SEM. It was found that the conventional sol-gel material only filled the trenches when the anneal temperature was 90° C. When the film was further densified, the conventional sol-gel material escaped from the trench and formed voids. This showed that superconformal feature fill is not possible with the conventional sol-gel material formed herein, even when initial wetting at low densification rates takes place.

Figure 11C:
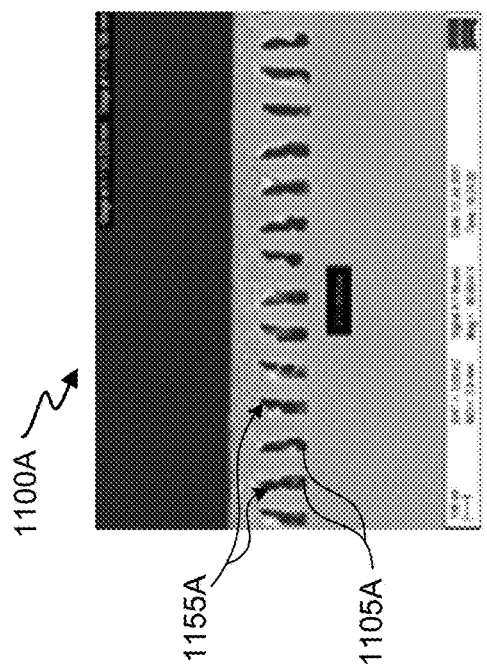
FIGS. 11C-11D depict images captured by a SEM after annealing according to comparative example 2.
Figure 11D:
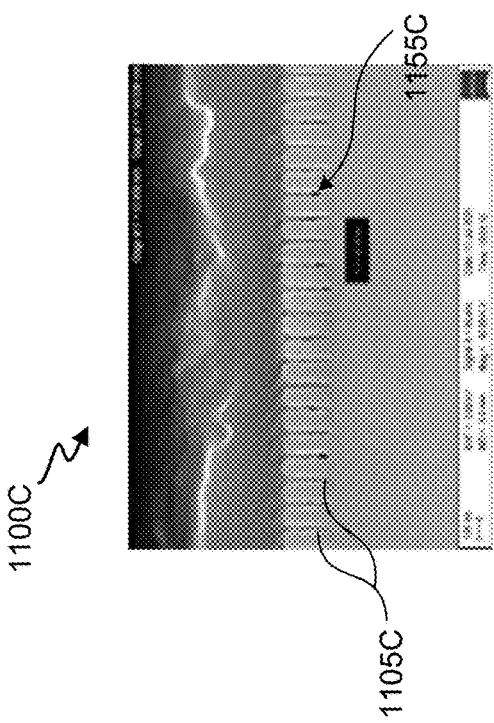

FIGS. 11C and 11D provide images of the conventional sol-gel coating captured by the SEM after annealing. Image 1100C in FIG. 11C shows recessed features 1105C filled with the conventional sol-gel coating after annealing to a temperature of 90° C. Image 11D of FIG. 11D shows recessed features 1105D that were not filled by the conventional sol-gel coating after annealing to a temperature of 330° C. As shown, the conventional sol-gel material filled the trenches 1105C when the annealing temperature was 90° C. (FIG. 11C), though some voids formed within at least some of the trenches, but more significant voids 1155D formed when annealed to 330° C. (FIG. 11D). The black areas in the images 1100C and 1100D corresponds to voids 1155C and 1155D formed in the trenches 1105C and 1105D, respectively.

Table 1 provided below summarizes the results of comparative examples 1 and 2. The grey highlight in the Feature Fill column indicates formation of voids.

TABLE 1

| Examples | Material | Substrate | Preparation | Thickness (nm) | RI@5 20 nm | Shrinkage (%) | Feature Fill |
|---|---|---|---|---|---|---|---|
| 1 | Tetraisoprop oxide | Si + O2 plasma | 90° C. (P) | 591 | 1.60 | 0 | No |
| | | | 200° C. (P) | 213 | 1.78 | 64 | No |
| | | | 330° C. (P) | 107 | 2.08 | 82 | No |
| | | | 600° C. (P) | 84.1 | 2.21 | 86 | No |
| 2 | Titanium (IV) sol-gel | Si + TiO2 Seed + O2 plasma | 90° C. (P) | 596 | 1.58 | 0 | Yes (some holes) |
| | | | 200° C. (P) | 222 | 1.77 | 63 | No |
| | | | 330° C. (P) | 101 | 2.10 | 83 | No |
| | | | 600° C. (P) | 77.5 | 2.26 | 87 | No |

Working Examples 3-11

The following working examples illustrate the recessed feature fill characteristics of an example feature fill sol-gel material according to this disclosure.

Examples 3-5

Example 3

Titanium(IV) oxysulfate and nitric acid were dissolved in a water solvent to reach a concentration of 10% w/w of the Titanium(IV) complex to form a feature fill sol-gel material. The feature fill sol-gel material was coated onto a flat silicon substrate. The substrate was then annealed at 90, 200, and 330° C. to form a conformal sol-gel coating. The thickness and RI of the conformal sol-gel coating was measured via ellipsometry. As shown in Table 2 (provided below), it was found that the conformal sol-gel coating shrank by about 60% during the annealing process. Furthermore, it was found that the conformal sol-gel coating was essentially fully condensed after the 200° C. anneal, indicating that the Titanium(IV) precursor enables low temperature annealing. The highest RI attained by the film was 1.81.

Example 4

Titanium(IV) oxysulfate and nitric acid were dissolved in a water solvent to reach a concentration of 50% w/w of the Titanium(IV) complex to form a feature fill sol-gel material. The feature fill sol-gel material was coated onto a flat silicon substrate. The substrate was then annealed at 90, 200, 330 and 600° C. to form a conformal sol-gel coating. The thickness and RI of the conformal sol-gel coating was measured via ellipsometry. As shown in Table 2, it was found that the conformal sol-gel coating shrank by about 60% during the annealing process. Furthermore, it was found that the conformal sol-gel coating essentially retained its thickness (e.g., thickness did not shrink) and RI upon annealing at 450° C. This shows that the conformal sol-gel coating made from the Titanium(IV) precursor can be used to form films that are stable over a wide thermal range.

Example 5

Titanium(IV) oxysulfate and nitric acid were dissolved in water solvent to reach a concentration of 50% w/w of the Titanium(IV) complex to form a feature fill sol-gel material, and the solution was stored under ambient conditions for one week. The feature fill sol-gel material was coated onto a flat silicon substrate. The substrate was then annealed at 90, 200 and 330° C. to form a conformal sol-gel coating. The thickness and RI of the conformal sol-gel coating was measured via ellipsometry. As shown in Table 2, it was found that the conformal sol-gel coating shrinkage upon annealing and final RI upon shrinkage was essentially the same as that produced by a fresh feature fill sol-gel material solution. Thus, the results show that Titanium(IV) oxo precursors can be used to produce stable sol-gel solutions with stable coating and optical performance.

TABLE 2

| Examples | Material | Dilution | Substrate | Preparation | Thickness (nm) | RI@520 nm | Shrinkage (%) |
|---|---|---|---|---|---|---|---|
| 3 | 10% Ti-O-SO4 in water | H2O | Si + plasma | 140 | 68.7 | 1.54 | 0 |
| | | | | 200 | 26.9 | 1.81 | 63 |
| | | | | 330 | 25.1 | 1.81 | 63 |
| 4 | 50% Ti-O-SO4 in water | | | 90 | 289 | 1.54 | 0 |
| | | | | 330 | 116 | 1.79 | 60 |
| | | | | 450 | 116 | 1.78 | 60 |
| | | | | 600 | 106 | 1.54 | 63 |
| 5 | 50% Ti-O-SO4 in water | | | 90 | 314 | 1.54 | 0 |
| | | | | 200 | 145 | 1.80 | 54 |
| | | | | 330 | 132 | 1.81 | 58 |

Examples 6, 7, and 8

Example 6

Figure 12A:
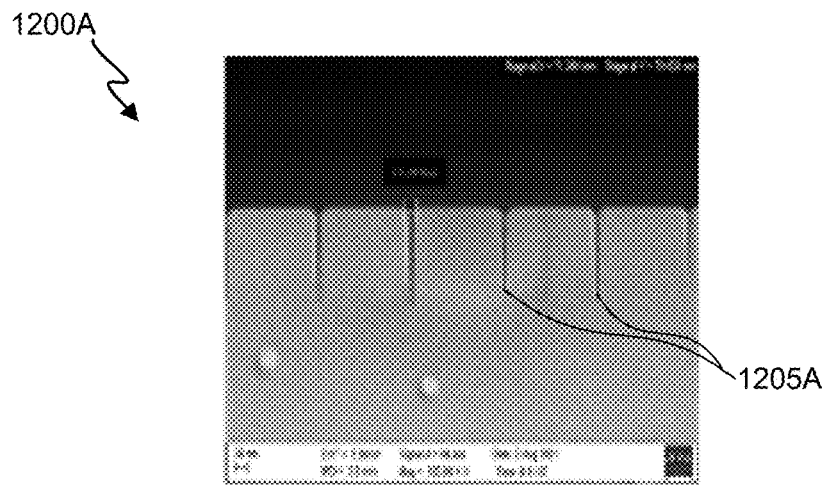
FIGS. 12A-12C depict images captured by a SEM after annealing according to working examples 6, 7, and 8, respectively.

Titanium(IV) oxysulfate and nitric acid were dissolved in water solvent to reach a concentration of 25% w/w of the Titanium(IV) complex to form a feature fill sol-gel material. The feature fill sol-gel material was coated onto a silicon substrate that had been cleaned with an oxygen gas plasma. The substrate contained nano-sized trenches ranging from 15 to 100 nm wide and 220 nm deep. The substrate was then annealed at 330° C. to form a conformal sol-gel coating. Finally, the substrate was cross-sectioned and the quality of the trench-fill by the conformal sol-gel coating was determined via SEM. As shown in Table 3 (provided below), it was found that the conformal sol-gel coating penetrated all the trenches fully, and that it remained inside the trenches even after annealing and shrinking. FIG. 12A provides image 1200A taken by a SEM of the substrate after annealing. As shown, the conformal sol-gel coating fully penetrated trenches 1205A and no voids are present after annealing. The lack of black areas within the trenches 1205A indicates the lack of voids.

Example 7

Figure 12B:
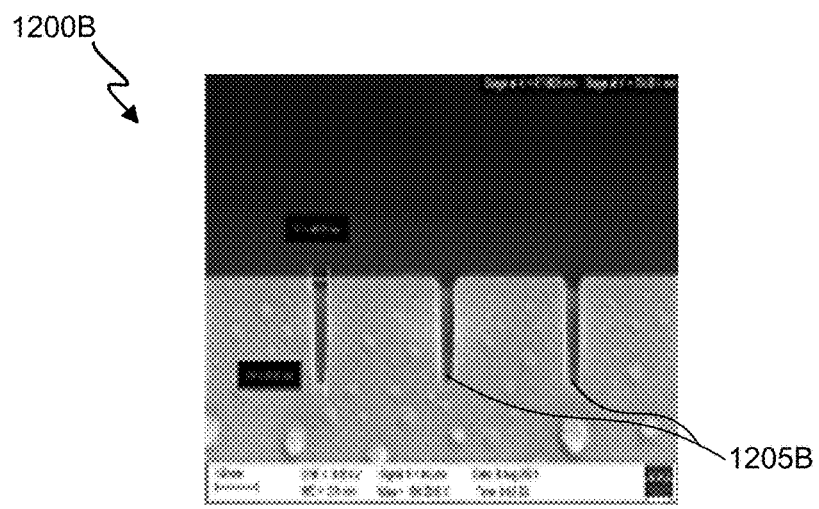

Titanium(IV) oxysulfate and nitric acid were dissolved in water and PGME solvent to reach a concentration of 6.25% w/w of the Titanium(IV) complex to form a feature fill sol-gel material. The feature fill sol-gel material was coated onto a silicon substrate that had been cleaned with an oxygen gas plasma. The substrate contained nano-sized trenches ranging from 15 to 100 nm wide. The substrate was then annealed at 330° C. to form a conformal sol-gel coating. Finally, the substrate was cross-sectioned and the quality of the trench-fill by the conformal sol-gel coating was determined via SEM. As shown in Table 3, it was found that the conformal sol-gel coating penetrated all the trenches fully, and that it remained inside the trenches even after annealing and shrinking. Relative to Example 6, this result shows that the thickness of the sol-gel coating can be varied by controlling the concentration of the Titanium(IV) oxo solution, yet this does not impact feature fill quality. FIG. 12B provides image 1200B taken by a SEM of the substrate after annealing. As shown, the conformal sol-gel coating fully penetrated the trenches 1205B and no voids are present after annealing. The lack of black areas within the trenches 1205B indicates the lack of voids.

Example 8

Figure 12C:
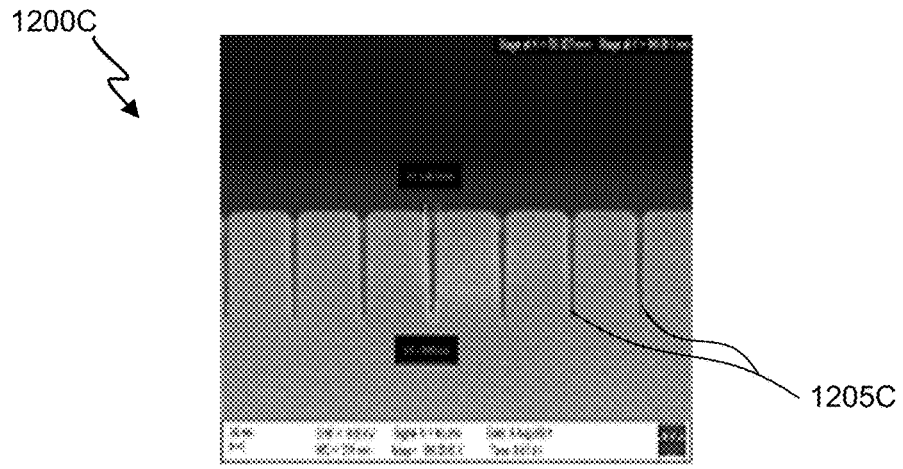

Titanium(IV) oxysulfate and nitric acid were dissolved in water, PGME, hydrogen peroxide and isopropyl alcohol solvent to reach a concentration of 6.25% w/w of the Titanium(IV) complex to form the feature fill sol-gel material. The feature fill sol-gel material was coated onto a silicon substrate that had been cleaned with an oxygen gas plasma. The substrate contained nano-sized trenches ranging from 15 to 100 nm wide and 220 nm deep. The substrate was then annealed at 330° C. to form the conformal sol-gel coating. Finally, the substrate was cross-sectioned and the quality of the trench-fill by the conformal sol-gel coating was determined via SEM. As shown in Table 3, it was found that the conformal sol-gel coating penetrated all the trenches fully, and that it remained inside the trenches even after annealing and shrinking. The same sol-gel solution was then coated onto a transparent fused silica substrate and annealed at 330° C. The absorption of the conformal sol-gel coating was measured at 450 nm. It was found that the absorption to the film was 0.01%/150 nm. This shows that a highly transparent coating with feature fill capabilities can be made from the Titanium(IV) oxo precursor. FIG. 12C provides image 1200C taken by a SEM of the substrate after annealing. As shown, the conformal sol-gel coating fully penetrated the trenches 1205C and no voids are present after annealing. The lack of black areas within the trenches 1205C indicates the lack of voids.

TABLE 3

| Example | Material | Material 1 Concentration | Dilution | Substrate | Anneal | Gap-Fill |
|---|---|---|---|---|---|---|
| 6 | 25% Ti-O-SO4 + 0.5% HNO3 in water | 100% | None | Si + O2 plasma | 330° C. | Yes |
| 8 | 25% Ti-O-SO4 + 0.5% HNO3 in water | 25% | PGME | | | Yes |
| 9 | 25% Ti-O-SO4 + 0.5% HNO3 in water | 25% | PGME + 2.5% IPA + 1% H2O2 solution (30% H2O2 in water) | | | Yes |

Examples 9 and 10

Example 9

Figure 13A:
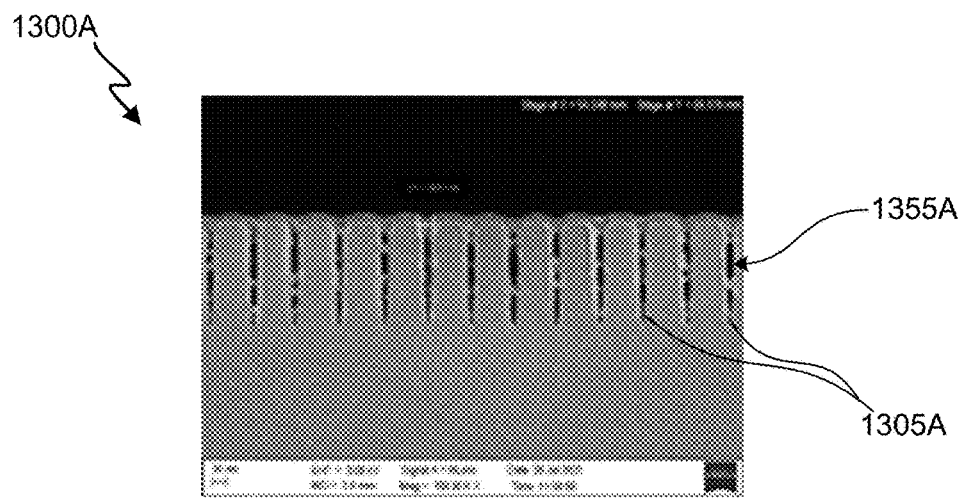
FIG. 13A-13C provide images taken by a SEM of the substrate after annealing according to working examples 9 and 10.

Titanium(IV) oxyacetylacetonate and nitric acid were dissolved in PGME solvent to reach a concentration of 10% w/w of the Titanium(IV) complex to form the feature fill sol-gel material. The feature fill sol-gel material was coated onto a silicon substrate that had been cleaned with an oxygen gas plasma. The substrate contained nano-sized trenches ranging from 15 to 100 nm wide and 220 nm deep. The substrate was then annealed at 90, 200 and 330° C. to form the conformal sol-gel coating. The thickness and RI of the conformal sol-gel coating was measured via ellipsometry. As shown in Table 4 (provided below), it was found that the conformal sol-gel coating shrank by about 50% during the annealing process and the RI reached a maximum of 2.05. Finally, the substrate was cross-sectioned and the quality of the trench-fill by the conformal sol-gel coating was determined via SEM. It was found that the conformal sol-gel coating did not penetrate the trenches upon annealing and shrinking. FIG. 13A provides image 1300A taken by a SEM of the substrate after annealing at 90° C. As shown, trenches 1305A were not penetrated by the conformal sol-gel coating, indicated by voids 1355A. The black areas within the trenches 1305C indicates the presence of voids.

Example 10

Titanium(IV) oxysulfate, titanium(IV) oxyacetylacetonate and nitric acid were dissolved in water and PGME solvent to reach a concentration of 10% w/w of total Titanium(IV) complex to form a feature fill sol-gel material. The feature fill sol-gel material was coated onto a silicon substrate that had been cleaned with an oxygen gas plasma. The substrate contained nano-sized trenches ranging from 15 to 100 nm wide and 220 nm deep. The substrate was then annealed at 90, 200 and 330° C. to form the conformal sol-gel coating. The thickness and RI of the conformal sol-gel coating was measured via ellipsometry. As shown in Table 4, it was found that the conformal sol-gel coating shrank by about 60% during the annealing process and the RI reached a maximum of 1.95. This shows that a second Titanium(IV) oxo precursor can be mixed in order to mediate the RI of a coating containing Titanium(IV) oxysulfate.

The substrate was cross-sectioned and the quality of the trench-fill by the conformal sol-gel coating was determined via SEM. It was found that the conformal sol-gel coating penetrated all the trenches fully, and that it remained inside the trenches even after annealing and shrinking. This shows that Titanium(IV) oxysulfate can be used as a scaffold to retain the feature fill sol-gel material inside the recessed features while the second Titanium(IV) oxo species is used to modulate the coating RI. Finally, the same feature fill sol-gel material solution was then coated onto a transparent fused silica substrate and annealed at 90° C. followed by annealing at 330° C. The absorption of the conformal sol-gel coating was measured at 450 nm. It was found that the absorption to the conformal sol-gel coating was 0.15% per 150 nm. This shows that a highly transparent coating with feature fill capabilities and controllable RI can be made from the feature fill sol-gel material containing titanium(IV) oxo mononuclear species.

Figure 13B:
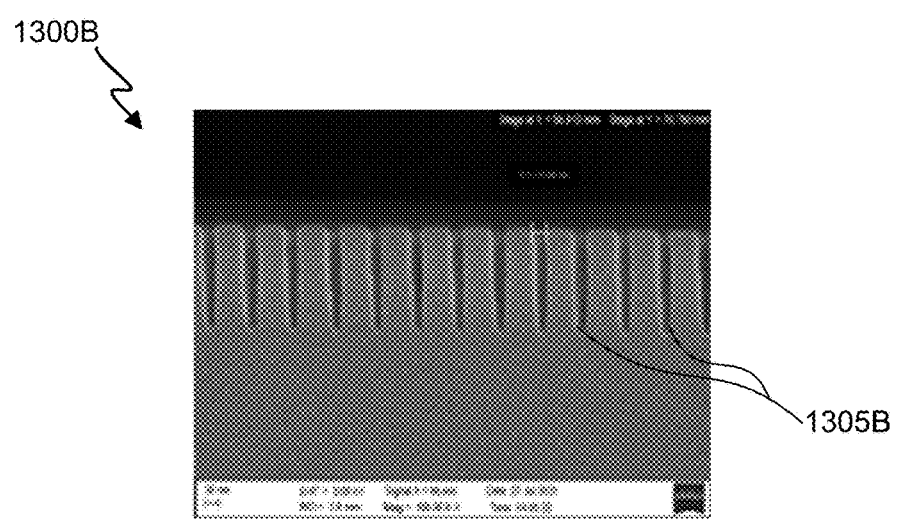
Figure 13C:
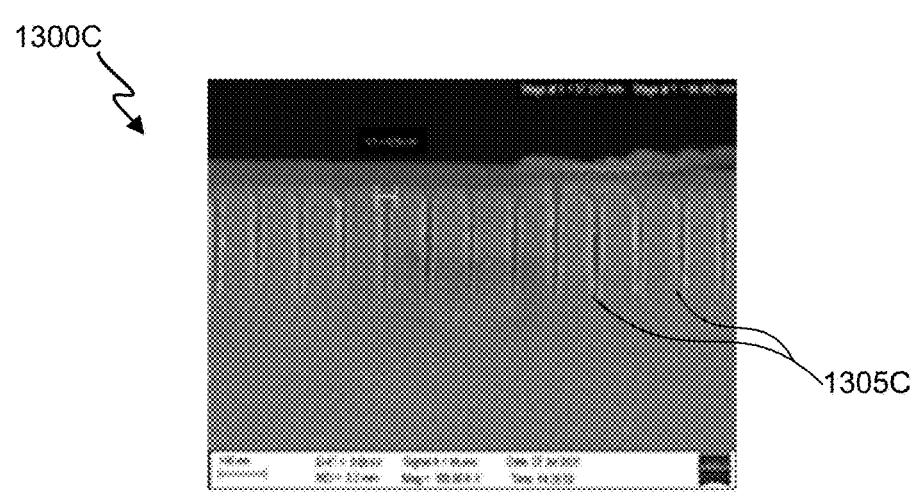

FIGS. 13B and 13C provide images 1300B and 1300C, respectively, taken by a SEM of the substrate after annealing. The image 1300B in FIG. 13B was taken after annealing to a temperature of 90° C. and the image 1300C of FIG. 13C was taken after annealing to a temperature of 330° C. As shown, the conformal sol-gel coating fully penetrated the trenches 1305B and 1305C and no voids are present after annealing at both temperatures. The lack of black areas within the trenches 1305B and 1305C indicates the lack of voids.

TABLE 4

| Example | Material 1 | Material 1 concentration | Material 2 | Material 3 Concentration | Dilution | Substrate | Anneal | Thickness (nm | RI@ 520 nm | Gap Fill |
|---|---|---|---|---|---|---|---|---|---|---|
| 9 | 10% Ti-O-Acac + 0.5% HNO3 in PGME | 100% | None | None | PGME | Si polished | 90 | 59.2 | 1.72 | NO |
|   |   |   |   |   |   |   | 200 | 37.6 | 1.89 | NO |
|   |   |   |   |   |   |   | 330 | 29.4 | 2.05 | NO |
| 10 | 10% Ti-O-Acac + 0.5% HNO3 in PGME | 50% | 10% Ti-O-SO4 + 0.5% HNO3 in water | 50% | PGME |   | 90 | 384 | 1.55 | YES |
|   |   |   |   |   |   |   | 200 | 177 | 1.83 | YES |
|   |   |   |   |   |   |   | 330 | 153 | 1.94 | YES |

Example 11

Titanium(IV) oxysulfate, titanium(IV) oxyacetylacetonate and nitric acid were dissolved in water and PGME solvent to reach a concentration of 0.35% w/w of total Titanium(IV) complex to form a feature fill sol-gel material. The feature fill sol-gel material was coated onto a silicon substrate that had been cleaned with an oxygen gas plasma. The substrate contained nano-sized trenches ranging from 15 to 35 nm wide and 100 to 220 nm deep. The substrate was then annealed at 330° C. to form the conformal sol-gel coating. The substrate was cross-sectioned and the quality of the trench-fill by the conformal sol-gel coating was determined via SEM. As shown in Table 5 (provided below), it was found that the conformal sol-gel coating penetrated all the trenches fully, and that it remained inside the trenches even after annealing and shrinking. On the top surface, however, the conformal sol-gel coating thickness was minimal and the bulk of the conformal sol-gel coating was essentially and selectively inside the recessed features. This result demonstrates that the feature fill sol-gel material containing two Titanium(IV) oxo precursors can be used for superconformal feature fill with a sol-gel material with reduced shrinkage, tunable RI, and high transparency.

Figure 14A:
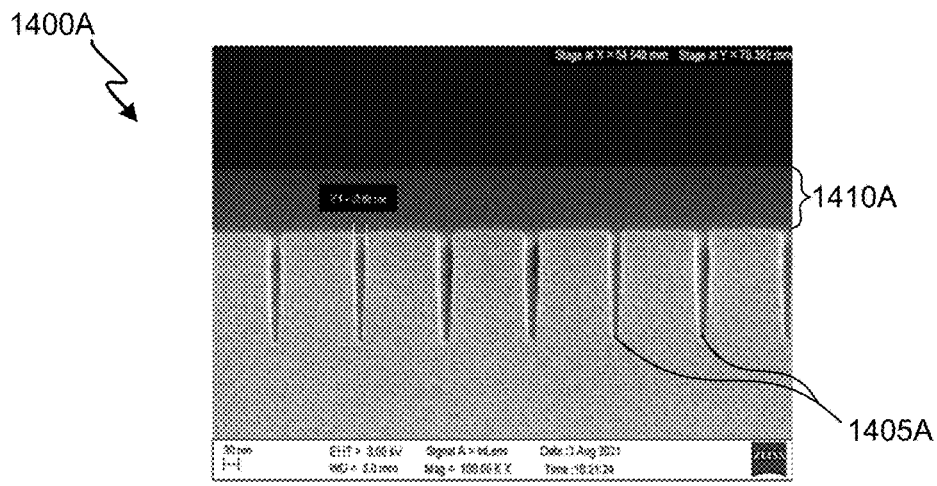
FIGS. 14A-14C provide images taken by a SEM according to working example 11.
Figure 14B:
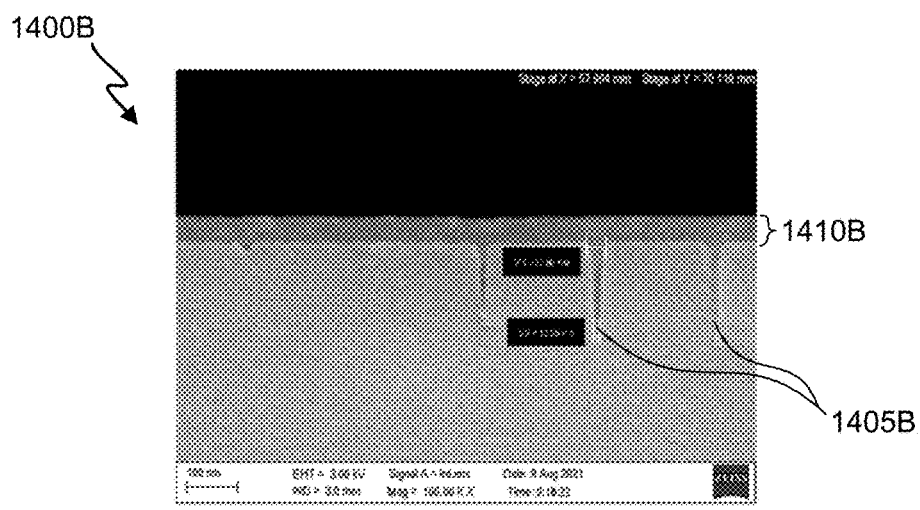
Figure 14C:
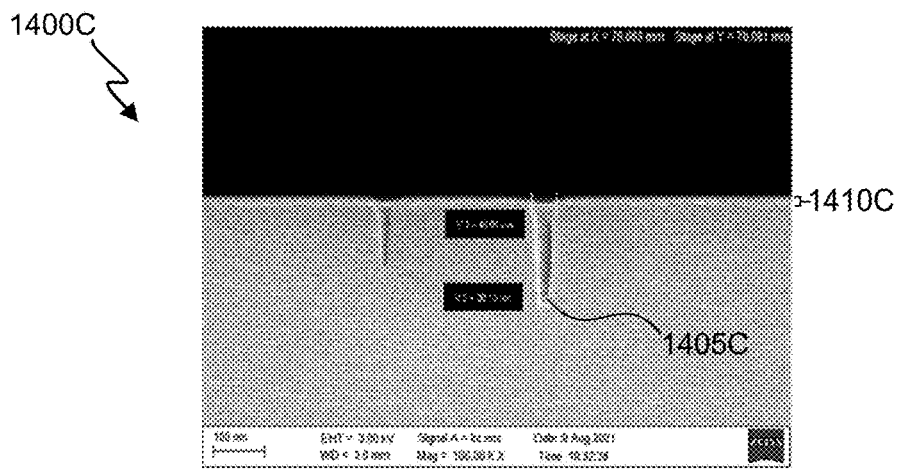

FIGS. 14A-14C depict images 1400A-C taken by the SEM according to this example at various percent overfill. The image 1400A in FIG. 14A shows a 50% overfill, indicated by thickness 1410A, the image 1400B in FIG. 14B shows a 25% overfill, indicated by thickness 1410B, and the image 1400C in FIG. 14C shows a 2% overfill, indicated by thickness 1410C. Overfill equates to the thickness of the conformal sol-gel coating on the top surface of the substrate over the depth of the recessed features.

Examples 12-19

Titanium(IV) oxysulfate and nitric acid were dissolved in water solvent to reach a concentration of 25% w/w of the Titanium(IV) complex to form a feature fill sol-gel solution. The feature fill sol-gel solution was then diluted with a variety of solvents of various types, comprising a propylene glycol, an ethylene glycol, a lactone, a ketone, an alcohol, a diol, an acetate, or an ether, as illustrated by Table 6 below to form the feature fill sol-gel material. The feature fill sol-gel material was coated onto a silicon substrate that had been cleaned with an oxygen gas plasma. The substrate contained nano-sized trenches ranging from 15 to 100 nm wide. The substrate was then annealed at 90° C. for 5 minutes and at 330° C. for 1 minute to form the conformal sol-gel coating. Finally, the substrate was cross-sectioned and the quality of the trench-fill by the conformal sol-gel coating was determined via SEM. As shown in Table 6, the conformal sol-gel coating penetrated all the trenches fully for each of the solvents of Examples 12-19. The conformal sol-gel coating also remained inside the trenches even after annealing and shrinking.

TABLE 5

| Example | Material 1 | Material 1 Concentration | Material 2 | Material 2 Concentration | Dilution | Substate | Anneal | Gap Fill |
|---|---|---|---|---|---|---|---|---|
| 11 | 10 % Ti-O-Acac in PGME | 1% | 25% Ti-O-SO4 + 0.5% HNO3 in water | 1% | PGME + 2% H2O2 | Si polished | 330 | YES |

TABLE 6

| Example | Solvent Class | Material 1 | Material 1 concentration | Material 2 | Material 2 Concentration | Dilution Solvent | Substrate | Anneal | Gap Fill |
|---|---|---|---|---|---|---|---|---|---|
| 12 | Propylene glycol | 25% Ti-O-SO4 + 0.5% HNO3 in water | 10 % | PGME | 10% | DPGME | Si + O2 plasma | 90° C. 5 Min + 330° C. 1 min | YES |
| 13 | Ethylene glycol | | | | 10% | Triethyleneglycol | | | YES |
| 14 | Lactone | | | | 10% | GBL | | | YES |
| 15 | Ketone | | | | 10% | Butanone | | | YES |
| 16 | Alcohol | | | | 10% | Butanol | | | YES |
| 17 | Dioi | | | | 10% | 1,2-butane diol | | | YES |
| 18 | Acetate | | | | 30% | Propyiene glycol methyl ether acetate | | | YES |
| 19 | Ether | | | | 30% | Dioxane | | | YES |

Examples 20 and 21

Example 20 (Comparative)

A TiCl$_4$-based sol was prepared by adding TiCl$_4$ to a solution of PGME and water to reach a concentration of 5% w/w of the Titanium(IV) complex to form a sol-gel solution. The sol-gel solution was then aged at 60° C. and diluted further with PGME solvent to form a sol-gel material. The sol-gel material was coated onto a silicon substrate that had been cleaned with an oxygen gas plasma. The substrate contained nano-sized trenches ranging from 15 to 100 nm wide and 220 nm deep. The substrate was then annealed at 90° C., 200° C., and 330° C. to form a sol-gel coating. The sol-gel coating thickness and RI was measured via ellipsometry. As shown in Table 7, it was found that the sol-gel coating shrank by about 50% during the annealing process and the RI reached a maximum of 2.14. Finally, the substrate was cross-sectioned and the quality of the trench-fill by the sol-gel was determined via SEM. It was found that the sol-gel coating did not fill the trenches. Instead, the material shrank and pulled away from the trenches, leaving behind voids inside the trenches.

Example 21

A TiCl$_4$-based sol was prepared by adding TiCl$_4$ to a solution of PGME and water to reach a concentration of 5% w/w of the Titanium(IV) complex to form a feature fill sol-gel solution. The feature fill sol-gel solution was then aged at 60° C. The feature fill sol-gel solution was combined with a solution of Titanium(IV) oxysulfate in water and the mixture was further diluted with PGME solvent to form a feature fill sol-gel material. The feature fill sol-gel material was coated onto a silicon substrate that had been cleaned with an oxygen gas plasma. The substrate contained nano-sized trenches ranging from 15 to 100 nm wide and 220 nm deep. The substrate was then annealed at 90° C., 330° C., and 450° C. to form a conformal sol-gel coating. The thickness and RI of the conformal sol-gel coating was measured via ellipsometry. As shown in Table 7, it was found that the conformal sol-gel coating shrank by about 40% during the annealing process and the RI reached a maximum of 1.96. This shows that a second Titanium(IV) oxo precursor, TiCl$_4$-based sol, can be mixed in order to mediate the RI of a coating containing Titanium(IV) oxysulfate. Furthermore, the substrate was cross-sectioned and the quality of the trench-fill by the conformal sol-gel coating was determined via SEM. It was found that the conformal sol-gel coating penetrated all the trenches fully, and that it remained inside the trenches even after annealing and shrinking. This shows that Titanium(IV) oxysulfate can be used as a scaffold to retain the conformal sol-gel coating inside the recessed features while the second Titanium(IV) oxo species, the TiCl$_4$-based sol-gel material, is used to modulate the coating RI. Finally, the same feature fill sol-gel solution was then coated onto a transparent fused silica substrate and annealed at 330° C. to form a conformal sol-gel coating. The absorption of the conformal sol-gel coating was measured at 450 nm. It was found that the absorption of the conformal sol-gel coating was 0.15% per 150 nm. This shows that a highly transparent coating with feature fill capabilities and controllable RI can be made from the titanium(IV) oxo mixture.

TABLE 7

| Example | Material 1 | Material 1 concentration | Material 2 | Material 2 Concentration | Dilution | Substrate | Anneal | Thickness (nm) | RI@520 nm | Gap Fill |
|---|---|---|---|---|---|---|---|---|---|---|
| 20 | 5% TiCl4 + 3% H2O in PGME | 12.5% | None | None | PGME | Si polished | 90 | 154 | 1.85 | NO |
| | | | | | | | 200 | 10 | 2.02 | NO |
| | | | | | | | 330 | 76 | 2.14 | NO |

TABLE 7-continued

| Example | Material 1 | Material 1 concentration | Material 2 | Material 2 Concentration | Dilution | Substrate | Anneal | Thickness (nm) | RI@5 20 nm | Gap Fill |
|---|---|---|---|---|---|---|---|---|---|---|
| 21 | 5% TiCl4 + 3% H2O in PGME | 12.5% | 10% Ti-O-SO4 + 0.5% HNO3 in water | 25% | PGME | | 90<br>330<br>450 | 146<br>106<br>91 | 1.77<br>1.84<br>1.96 | YES<br>YES<br>YES |

All patents, patent publications, patent applications, journal articles, books, technical references, and the like discussed in the instant disclosure are incorporated herein by reference in their entirety for all purposes.

Articles "a" and "an" are used herein to refer to one or to more than one (i.e. at least one) of the grammatical object of the article. By way of example, "an element" means at least one element and can include more than one element.

"About" is used to provide flexibility to a numerical range endpoint by providing that a given value may be "slightly above" or "slightly below" the endpoint without affecting the desired result.

It is to be understood that the figures and descriptions of the disclosure have been simplified to illustrate elements that are relevant for a clear understanding of the disclosure. It should be appreciated that the figures are presented for illustrative purposes and not as construction drawings. Omitted details and modifications or alternative embodiments are within the purview of persons of ordinary skill in the art.

It can be appreciated that, in certain aspects of the disclosure, a single component may be replaced by multiple components, and multiple components may be replaced by a single component, to provide an element or structure or to perform a given function or functions. Except where such substitution would not be operative to practice certain embodiments of the disclosure, such substitution is considered within the scope of the disclosure.

The examples presented herein are intended to illustrate potential and specific implementations of the disclosure. It can be appreciated that the examples are intended primarily for purposes of illustration of the disclosure for those skilled in the art. There may be variations to these diagrams or the operations described herein without departing from the spirit of the disclosure. For instance, in certain cases, method steps or operations may be performed or executed in differing order, or operations may be added, deleted or modified.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present disclosure is not limited to the embodiments described above or depicted in the drawings, and various embodiments and modifications can be made without departing from the scope of the claims below.

What is claimed is:

1. A feature fill sol-gel material for forming a superconformal sol-gel coating, wherein the feature fill sol-gel material comprises a first titanium precursor and a second titanium precursor that is different than the first titanium precursor, wherein the first titanium precursor comprises a titanium oxo mononuclear species and an inorganic ligand,
   wherein the feature fill sol-gel material is formed by dissolving or suspending the first titanium precursor in a solvent.

2. The feature fill sol-gel material of claim 1, wherein the titanium oxo mononuclear species comprises oxy-titanyl.

3. The feature fill sol-gel material of claim 1, wherein the first titanium precursor comprises an oxo ligand.

4. The feature fill sol-gel material of claim 1, wherein the inorganic ligand comprises at least one of a sulfate ligand, a phosphate ligand, a selenium oxide ligand, or a tellurium oxide ligand.

5. The feature fill sol-gel material of claim 1, wherein the solvent comprises at least one of water, propylene glycol, ethylene glycol, lactone, ketone, alcohol, diols acetate or ether.

6. The feature fill sol-gel material of claim 1, wherein:
   the first titanium precursor is Titanium(IV) oxysulfate; and
   the second titanium precursor comprises at least one of: Titanium(IV) oxyphosphate, Titanium(IV) oxyacetylacetonate, Titanium (IV) hydroxide, or a multinuclear network of condensed Titanium(IV) hydroxide.

7. The feature fill sol-gel material of claim 1, wherein the feature fill sol-gel material is annealed to form the superconformal sol-gel coating and the superconformal sol-gel coating comprises an optically transparent coating, wherein the optically transparent coating comprises an absorbance at a wavelength of 450 nm of less than 0.2% per 150 nm and a refractive index ranging from 1.65 to 2.20.

8. The feature fill sol-gel material of claim 1, wherein the feature fill sol-gel material further comprises one or more of an acid, a base, a peroxide, a surfactant, a cross-linker, a flexibilizer additive, a toughener additive, a polymer, or an additional solvent.

9. A method of producing a superconformal optical coating, the method comprising:
providing a feature fill sol-gel material, wherein forming the feature fill sol-gel material comprises dissolving or suspending a first titanium precursor comprising Titanium(IV) and an inorganic ligand in a solvent;
applying the feature fill sol-gel material onto a substrate comprising a plurality of recessed features; and
annealing the feature fill sol-gel material at an annealing temperature less than 500° C. to form the superconformal optical coating, wherein:
the feature fill sol-gel material fully densifies at the annealing temperature; and
the superconformal optical coating fills the plurality of recessed features without forming voids.

10. The method of claim 9, wherein the superconformal optical coating has a refractive index equal to or greater than 1.65.

11. The method of claim 9, wherein the plurality of recessed features comprise a feature width ranging from 1 nm to 300 nm and a feature depth ranging from 1 nm to 2000 nm, and wherein a ratio of the feature depth divided by the feature width is equal or greater than 2.

12. The method of claim 9, wherein the recessed features comprise one or more of gratings, trenches, vias, or through-holes.

13. The method of claim 9, wherein applying the feature fill sol-gel material onto the substrate comprises applying the feature fill sol-gel material to form the superconformal optical coating having a final thickness after annealing on a top surface of the substrate of less than 50 nm.

14. The method of claim 9, wherein applying the sol-gel material onto the substrate comprises spin-coating, dip-coating, spray-coating, ink-jet printing, screen-printing, or contact-printing.

15. The method of claim 9, wherein:
annealing the feature fill sol-gel material comprises thermally densifying the feature fill sol-gel material to form the superconformal optical coating for a duration less than 10 minutes; and
the superconformal optical coating has a refractive index equal to or greater than 1.65 after annealing.

16. A waveguide, wherein the waveguide comprises:
a substrate, wherein the substrate comprises a plurality of recessed features extending from an outer surface of the substrate to a depth into a bulk of the substrate; and
a superconformal optical coating applied to the substrate, wherein the superconformal optical coating:
is formed from a feature fill sol-gel material comprising a titanium precursor having an oxo-ligand; and
fills the plurality of recessed features, after annealing, without forming voids.

17. The waveguide of claim 16, wherein the superconformal optical coating comprises a refractive index ranging from 1.65 to 2.20 and an absorption of less than 0.2% per 150 nm of thickness.

18. The waveguide of claim 16, wherein the superconformal optical coating comprises a thickness on the outer surface of the substrate that is equal to or less than 50 nm.

19. The feature fill sol-gel material of claim 1, wherein a ratio of the first titanium precursor to the second titanium precursor is from 0.25:1 to 10:1 by weight.

20. The feature fill sol-gel material of 19, wherein the first titanium precursor is Titanium(IV) oxysulfate and the second titanium precursor is Titanium(IV) oxyacetylacetonate.

* * * * *